United States Patent
Wu et al.

(10) Patent No.: US 10,042,143 B2
(45) Date of Patent: Aug. 7, 2018

(54) IMAGE CAPTURING LENS SYSTEM, IMAGE CAPTURING APPARATUS AND ELECTRONIC DEVICE

(71) Applicant: LARGAN PRECISION CO., LTD., Taichung (TW)

(72) Inventors: Chien-Hsun Wu, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 15/496,098

(22) Filed: Apr. 25, 2017

(65) Prior Publication Data
US 2018/0172961 A1    Jun. 21, 2018

(30) Foreign Application Priority Data
Dec. 20, 2016  (TW) .............................. 105142307 A

(51) Int. Cl.
| | |
|---|---|
| G02B 9/62 | (2006.01) |
| G02B 13/18 | (2006.01) |
| G02B 3/02 | (2006.01) |
| G02B 5/20 | (2006.01) |
| B60R 1/00 | (2006.01) |

(52) U.S. Cl.
CPC ............. G02B 13/18 (2013.01); G02B 5/208 (2013.01); G02B 9/62 (2013.01); B60K 2350/106 (2013.01); B60K 2350/2013 (2013.01); B60R 1/00 (2013.01); B60R 2300/10 (2013.01); B60R 2300/80 (2013.01)

(58) Field of Classification Search
CPC ....... G02B 13/0045; G02B 9/62; G02B 13/04
USPC .......................... 359/713, 752, 756, 757, 759
See application file for complete search history.

(56) References Cited

U.S. PATENT DOCUMENTS

| | | |
|---|---|---|
| 2014/0240853 A1 | 8/2014 | Kubota et al. |
| 2015/0260952 A1 | 9/2015 | Tang et al. |
| 2017/0315330 A1* | 11/2017 | Chiu ........................ G02B 9/34 |

* cited by examiner

Primary Examiner — William Choi
(74) Attorney, Agent, or Firm — McClure, Qualey & Rodack, LLP

(57) ABSTRACT

An image capturing lens system includes six lens elements, which are, in order from an object side to an image side, a first lens element, a second lens element, a third lens element, a fourth lens element, a fifth lens element and a sixth lens element. The first lens element has positive refractive power.

27 Claims, 23 Drawing Sheets

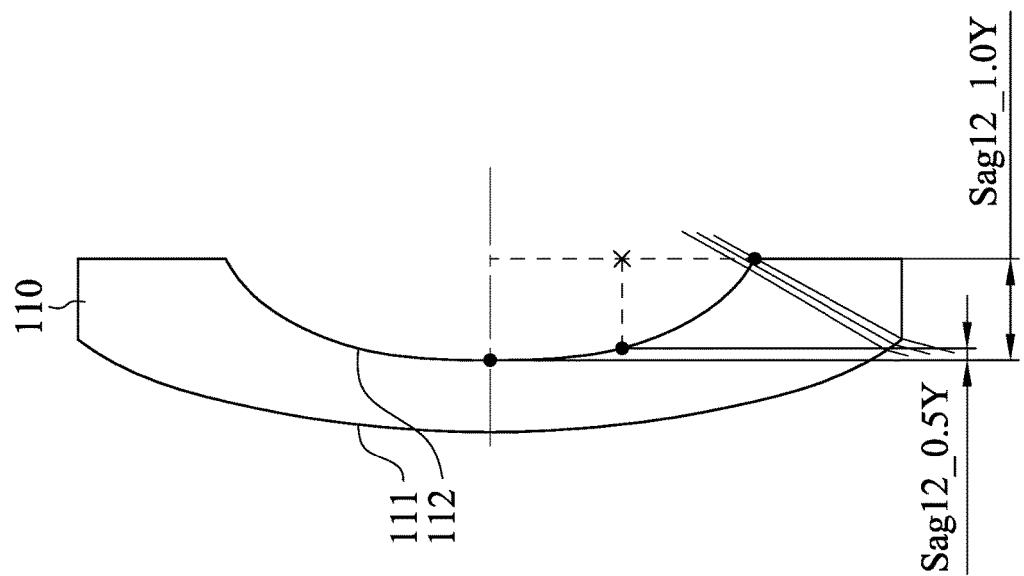

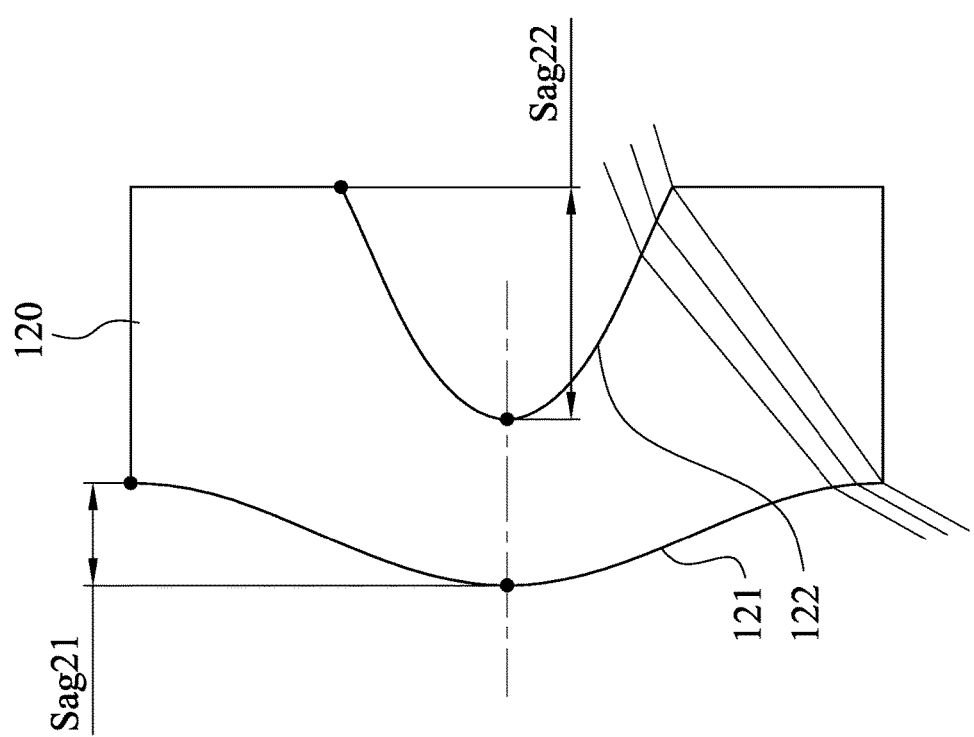

US 10,042,143 B2

IMAGE CAPTURING LENS SYSTEM, IMAGE CAPTURING APPARATUS AND ELECTRONIC DEVICE

RELATED APPLICATIONS

This application claims priority to Taiwan Application Serial Number 105142307, filed Dec. 20, 2016, which is herein incorporated by reference.

BACKGROUND

Technical Field

The present disclosure relates to an image capturing lens system and an image capturing apparatus. More particularly, the present disclosure relates to an image capturing lens system and an image capturing apparatus with a wider field of view applicable to electronic devices.

Description of Related Art

In recent years, with developments of hardware technology and software, functionality and applicable usages of the identification capability of electronic devices have greatly expanded, such as applications and developments for entertainments, family or personal security applications. However, those applications usually have to adopt lens assemblies with large fields of view and high image quality, and it would be more sensitive to image quality (like noise, ghost images, etc.) when the applications to the image identification are needed. Hence, there is a need for a lens assembly with a wider field of view and low image noise.

SUMMARY

According to one aspect of the present disclosure, an image capturing lens system includes six lens elements, the six lens elements being, in order from an object side to an image side, a first lens element, a second lens element, a third lens element, a fourth lens element, a fifth lens element and a sixth lens element. The first lens element has positive refractive power. When a maximum effective radius of an object-side surface of the first lens element is Y11, and an entrance pupil diameter of the image capturing lens system is EPD, the following condition is satisfied:

$12.5 < Y11/EPD$.

According to another aspect of the present disclosure, an image capturing apparatus includes the image capturing lens system of the aforementioned aspect and an image sensor, wherein the image sensor is disposed on an image surface of the image capturing lens system.

According to another aspect of the present disclosure, an electronic device includes the image capturing apparatus of the aforementioned aspect.

According to one aspect of the present disclosure, an image capturing lens system includes six lens elements, the six lens elements being, in order from an object side to an image side, a first lens element, a second lens element, a third lens element, a fourth lens element, a fifth lens element and a sixth lens element. The first lens element has at least one of an object-side surface and an image-side surface being aspheric, and at least one of the object-side surface and the image-side surface of the first lens element includes at least one inflection point. When a maximum effective radius of an object-side surface of the first lens element is Y11, an entrance pupil diameter of the image capturing lens system is EPD, a focal length of the image capturing lens system is f, a curvature radius of the object-side surface of the first lens element is R1, a curvature radius of the image-side surface of the first lens element is R2, and a maximum field of view of the image capturing lens system is FOV, the following conditions are satisfied:

$12.5 < Y11/EPD$;

$(f/|R1|)+(f/|R2|) < 0.15$; and $120 \text{ degrees} < FOV < 220 \text{ degrees}$.

BRIEF DESCRIPTION OF THE DRAWINGS

The present disclosure can be more fully understood by reading the following detailed description of the embodiment, with reference made to the accompanying drawings as follows:

FIG. 17 is a schematic view of the parameters Sag12_1.0Y and Sag12_0.5Y of the image capturing lens system of FIG. 1;

FIG. 18 is a schematic view of the parameters Sag21 and Sag22 of the image capturing lens system of FIG. 1;

DETAILED DESCRIPTION

Figure 1:
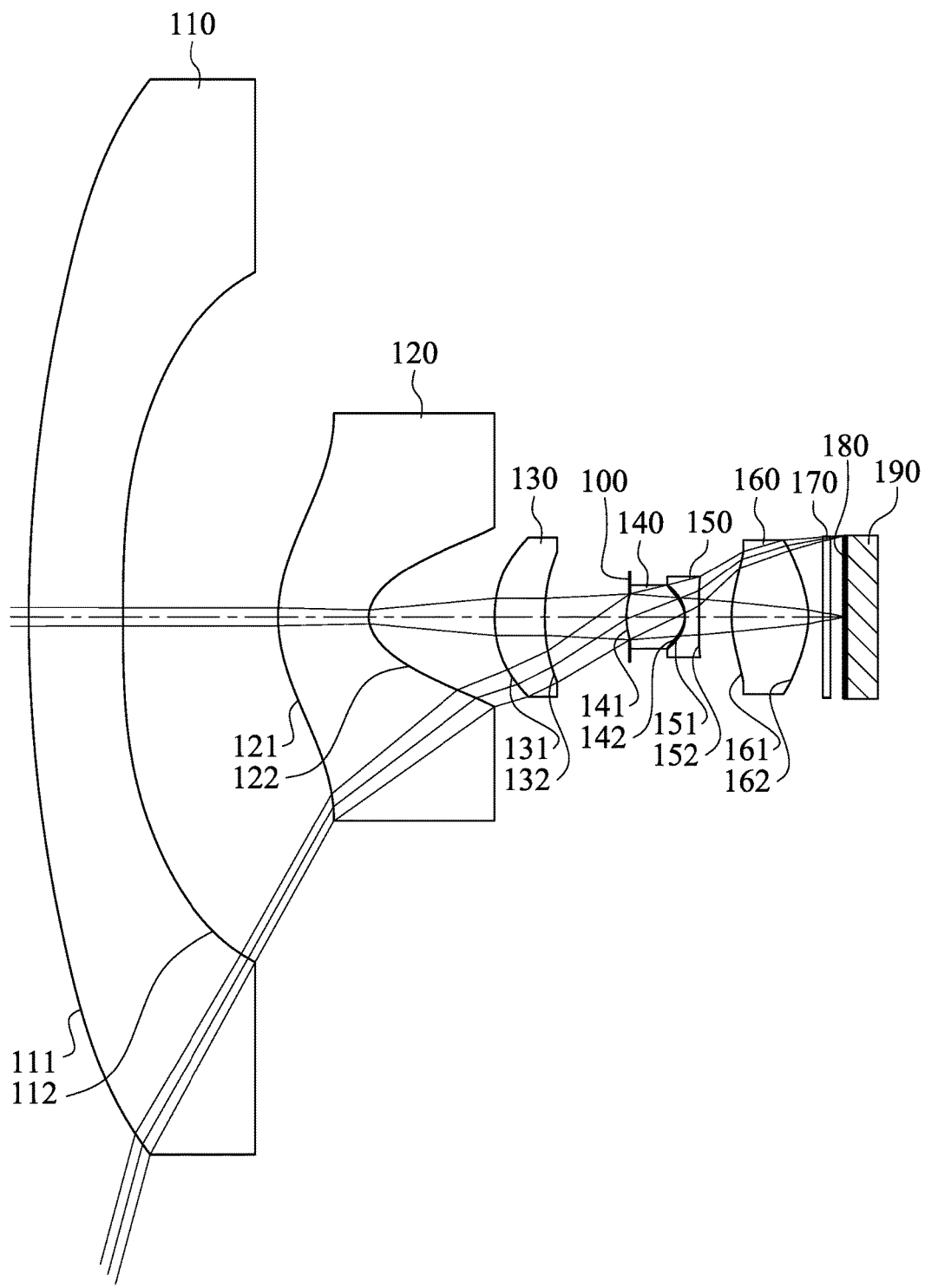
FIG. 1 is a schematic view of an image capturing apparatus according to the 1st embodiment of the present disclosure.

An image capturing lens system includes six lens elements, the six lens elements being, in order from an object side to an image side, a first lens element, a second lens element, a third lens element, a fourth lens element, a fifth lens element and a sixth lens element. At least two of the third lens element, the fourth lens element, the fifth lens element and the sixth lens element have positive refractive power, and at least one of the third lens element, the fourth lens element, the fifth lens element and the sixth lens element has negative refractive power.

In detail, the image capturing lens system can further include, in order from the object side to the image side: a front lens group, an aperture stop and a rear lens group. The front lens group with negative refractive power having lens elements of the six lens elements (which are the lens elements located between an imaged object and the aperture stop), and the rear lens group with positive refractive power having the other lens elements of the six lens elements (which are the lens elements located between the aperture stop and an image surface). Thus, it is favorable for providing the characteristic of the wide field of view and good image quality by arranging a retrofocus lens structure.

The first lens element can have positive refractive power, so that the noise generation can be reduced. Furthermore, at least one of an object-side surface and an image-side surface of the first lens element can include at least one inflection point. Hence, the refractive power of the first lens element can be reduced, so that insufficient corrections of image aberrations in the off-axial image due to the excessive refractive power of the first lens element can be avoided.

The second lens element can have negative refractive power, so that it is favorable for light entering into the image capturing lens system and converging on the image surface. The second lens element can have an object-side surface being convex and include at least one inflection point. Therefore, the shape variation of the object-side surface of the second lens element can be moderated, and it is favorable for decreasing the probability of surface reflections by avoiding the excessive refractive angle of the incident light due to the overly curved surfaces of the lens element.

The third lens element can have positive refractive power, so that it is favorable for light converging on the image surface in the image capturing lens system. The third lens element can have an object-side surface being convex, thus it is favorable for further avoiding the surface reflection by reducing the incident angle from the off-axial region.

The fourth lens element can have positive refractive power, so that it is to favorable for light entry into the image capturing lens system by balancing the positive refractive power of the third lens element.

The fifth lens element can have negative refractive power, so that aberrations of the image capturing lens system can be corrected.

The sixth lens element can have positive refractive power. Therefore, the principal point of the image capturing lens system can be positioned away from the image surface so as to reduce the back focal length for keeping the compactness.

When a maximum effective radius of the object-side surface of the first lens element is Y11, and an entrance pupil diameter of the image capturing lens system is EPD, the following condition is satisfied: 12.5<Y11/EPD. Therefore, by enlarging the maximum effective radius of the first lens element, shape variations of the surfaces of the first lens element can be moderated, the wide-angle light entry into the image capturing lens system can be improved, and the shape variations in the off-axial region can be also minimized while reducing image noises. Preferably, the following condition can be satisfied: 15<Y11/EPD<50. More preferably, the following condition can be satisfied: 17.5<Y11/EPD<35.

When a focal length of the image capturing lens system is f, a curvature radius of the object-side surface of the first lens element is R1, and a curvature radius of the image-side surface of the first lens element is R2, the following condition is satisfied: (f/|R1|)+(f/|R2|)<0.25. Therefore, the refractive power of the first lens element can be moderated, so that insufficient aberration corrections of the image periphery due to the excessive refractive power of the first lens element can be avoided. Preferably, the following condition can be satisfied: (f/|R1|)+(f/|R2|)<0.15.

When a maximum field of view of the image capturing lens system is FOV, the following condition is satisfied: 120 degrees<FOV<220 degrees. Therefore, it is favorable for maintaining a large field of view of the image capturing lens system.

When a focal length of the first lens element is f1, and a focal length of the second lens element is f2, the following condition is satisfied: |f2/f1|<0.30. Therefore, the main refractive power of the lens elements for retrieving incident light can be positioned closer to the image side, so that high curvature lens elements can be reduced in size so as to enhance the manufacturability.

When the maximum effective radius of the object-side surface of the first lens element is Y1, and a maximum image height of the image capturing lens system is ImgH, the following condition is satisfied: 2.5<Y11/ImgH<10. Therefore, it is favorable for ensuring the first lens element with sufficient maximum effective radius and moderating the shape variations in the off-axial region.

When the focal length of the first lens element is f1, the focal length of the second lens element is f2, a focal length of the third lens element is f3, a focal length of the fourth lens element is f4, a focal length of the fifth lens element is f5, and a focal length of the sixth lens element is f6, the following conditions are satisfied: |f2|<|f1|; |f3|<|f1|; |f4|<|f1|; |f5|<|f1|; and |f6|<|f1|. Therefore, the first lens element with the largest manufacturing tolerance of the six lens elements has weaker refractive power, so that the sensitivity of refractive power of the first lens element can be reduced.

When a displacement in parallel with an optical axis from an axial vertex on the image-side surface of the second lens element to a maximum effective radius position on the image-side surface of the second lens element is SAG22, and a maximum effective radius of the image-side surface of the second lens element is Y22, the following condition is satisfied: 1.0<Sag22/Y22<2.0. Therefore, the refraction angle of light from the off-axial region can be reduced effectively so as to avoid total internal reflection.

When a curvature radius of the object-side surface of the third lens element is R5, and a curvature radius of an image-side surface of the third lens element is R6, the following condition is satisfied: −2.5<(R5+R6)/(R5−R6)<0. Therefore, aberrations generated from the second lens element with relatively stronger refractive power can be corrected.

When a displacement in parallel with an optical axis from an axial vertex on the object-side surface of the second lens element to a maximum effective radius position on the object-side surface of the second lens element is Sag21, the displacement in parallel with an optical axis from an axial vertex on the image-side surface of the second lens element to a maximum effective radius position on the image-side surface of the second lens element is Sag22, and a central thickness of the second lens element is CT2, the following condition is satisfied: 0.4<(Sag22−Sag21)/CT2<1.5. Therefore, it is favorable for enhancing structure strength of the second lens element and increasing the manufacturability of the image capturing lens system by increasing the thickness of the second lens element in the off-axial region thereof.

When an axial distance between the first lens element and the second lens element is T12, and a central thickness of the first lens element is CT1, the following condition is satisfied: T12/CT1<2.0. Therefore, the manufacturablilty of the image capturing lens system would improve by avoiding the excessive distance between the first lens element and the second lens element.

When a displacement in parallel with an optical axis from an axial vertex on an image-side surface of the first lens element to a maximum effective radius position on the image-side surface of the first lens element is Sag12_1.0Y, and a displacement in parallel with an optical axis from an axial vertex on the image-side surface of the first lens element to a half of the maximum effective radius position on the image-side surface of the first lens element is Sag12_0.5Y, the following condition is satisfied: 5<Sag12_1.0Y/Sag12_0.5Y. Therefore, the partial lens surface with larger shape variation of the first lens element can be configured in the off-axial region thereof, so that the image quality of the central image can be enhanced.

Each of the aforementioned features of the image capturing lens system can be utilized in numerous combinations, so as to achieve the corresponding effects.

According to the image capturing lens system of the present disclosure, the lens elements thereof can be made of glass or plastic materials. When the lens elements are made of plastic materials, manufacturing costs can be effectively reduced. When the lens elements are made of glass materials, the distribution of the refractive power of the image capturing lens system may be more flexible to design. Furthermore, surfaces of each lens element can be arranged to be aspheric, since the aspheric surface of the lens element is easy to form a shape other than a spherical surface so as to have more controllable variables for eliminating aberrations thereof, and to further decrease the required amount of lens elements in the image capturing lens system. Therefore, the total track length of the image capturing lens system can also be reduced.

According to the image capturing lens system of the present disclosure, each of an object-side surface and an image-side surface has a paraxial region and an off-axial region. The paraxial region refers to the region of the surface where light rays travel close to an optical axis, and the off-axial region refers to the region of the surface away from the paraxial region. Particularly unless otherwise stated, when the lens element has a convex surface, it indicates that the surface can be convex in the paraxial region thereof; when the lens element has a concave surface, it indicates that the surface can be concave in the paraxial region thereof. According to the image capturing lens system of the present disclosure, the refractive power or the focal length of a lens element being positive or negative may refer to the refractive power or the focal length in a paraxial region of the lens element.

According to the image capturing lens system of the present disclosure, the image capturing lens system can include at least one stop, such as an aperture stop, a glare stop or a field stop. Said glare stop or said field stop is for eliminating the stray light and thereby improving the image resolution thereof.

According to the image capturing lens system of the present disclosure, the image surface of the image capturing lens system, based on the corresponding image sensor, can be flat or curved. In particular, the image surface can be a concave curved surface facing towards the object side.

According to the image capturing lens system of the present disclosure, an aperture stop can be configured as a middle stop, wherein a middle stop disposed between the first lens element and the image surface is favorable for enlarging the field of view of the image capturing lens system and thereby provides a wider field of view for the same.

According to the image capturing lens system of the present disclosure, the image capturing lens system can be applied to 3D (three-dimensional) image capturing applications, in products such as digital cameras, mobile devices, digital tablets, smart TVs, surveillance systems, motion sensing input devices, driving recording systems, rearview camera systems, and wearable devices.

According to the present disclosure, an image capturing apparatus is provided. The image capturing apparatus includes the aforementioned image capturing lens system and an image sensor, wherein the image sensor is disposed on the image side of the aforementioned image capturing lens system, that is, the image sensor can be disposed on or near the image surface of the aforementioned image capturing lens system. When the specific conditions are satisfied, the maximum effective radius of the first lens element can be enlarged, and it is favorable for the light from wider field of view converging in the image capturing lens system by arranging the first lens element with positive refractive power and aspheric surfaces so as to moderate the shape variation in the off-axial region of the lens element. Preferably, the image capturing apparatus can further include a barrel member, a holder member or a combination thereof.

According to the present disclosure, an electronic device is provided, which includes the aforementioned image capturing apparatus. Preferably, the electronic device can further include but not limited to a control unit, a display, a storage unit, a random access memory unit (RAM) or a combination thereof.

According to the above description of the present disclosure, the following 1st-12th specific embodiments are provided for further explanation.

1st Embodiment

Figure 2:
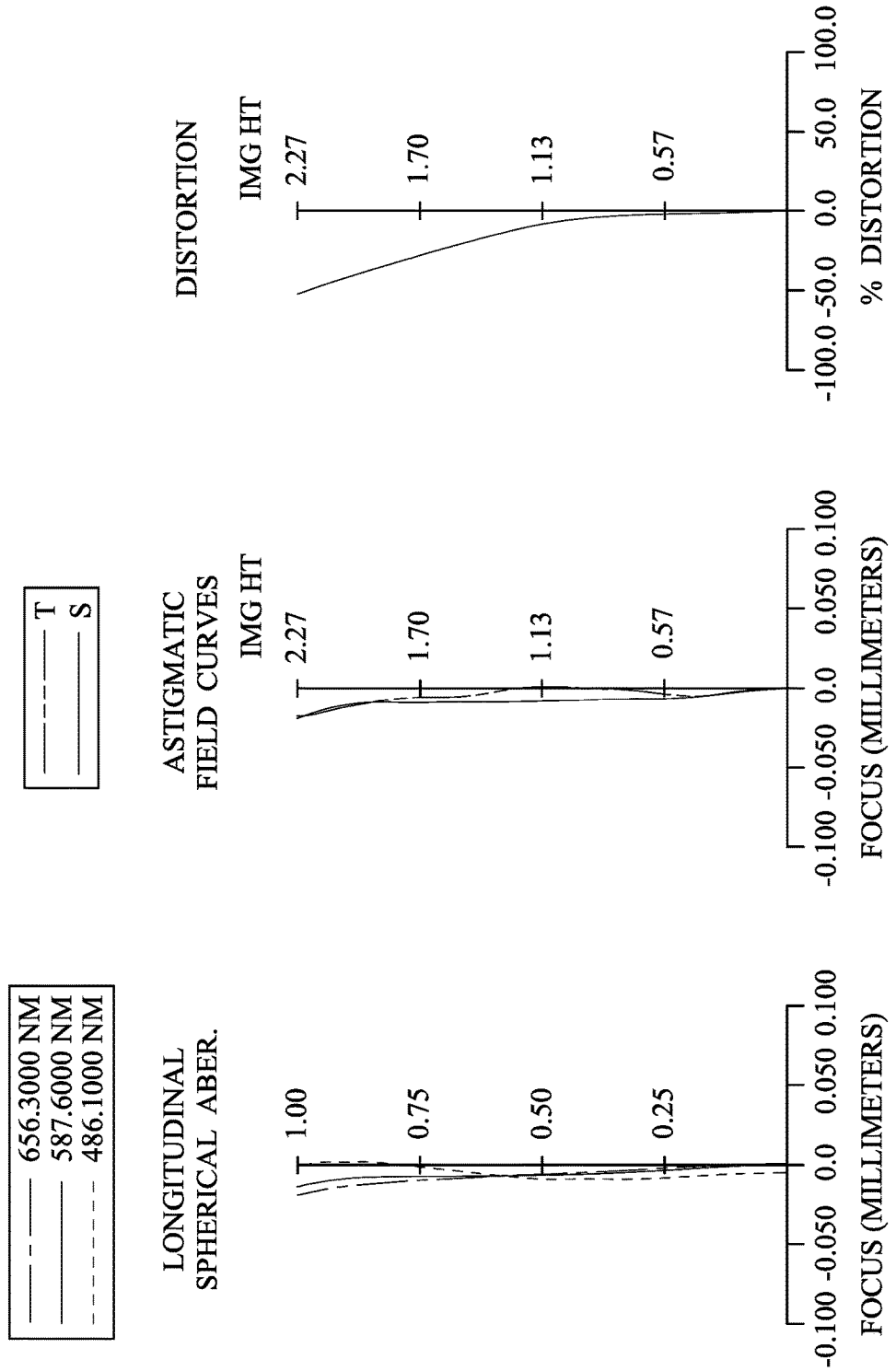
FIG. 2 shows spherical aberration curves, astigmatic field curves and a distortion curve of the image capturing apparatus according to the 1st embodiment.

FIG. 1 is a schematic view of an image capturing apparatus according to the 1st embodiment of the present disclosure. FIG. 2 shows spherical aberration curves, astigmatic field curves and a distortion curve of the image capturing apparatus according to the 1st embodiment. In FIG. 1, the image capturing apparatus includes the image capturing lens system (its reference numeral is omitted) and an image sensor 190. The image capturing lens system includes, in order from an object side to an image side, a first lens element 110, a second lens element 120, a third lens element 130, an aperture stop 100, a fourth lens element 140, a fifth lens element 150, a sixth lens element 160, an IR-cut filter 170 and an image surface 180. The image sensor 190 is disposed on the image surface 180 of the image capturing lens system. The imaging optical lens system includes six lens elements (110, 120, 130, 140, 150, and 160) without additional one or more lens elements inserted between the first lens element 110 and the sixth lens element 160, wherein the lens elements (the first, second, and third lens elements) located between an imaged object and the aperture stop 100 are a front lens group, and the lens elements (the fourth, fifth, and sixth lens elements) located between the aperture stop 100 and the image surface 180 are a rear lens group.

The first lens element 110 with positive refractive power has an object-side surface 111 being convex and an image-side surface 112 being concave. The first lens element 110 is made of a plastic material, and has the object-side surface 111 and the image-side surface 112 being both aspheric.

The second lens element 120 with negative refractive power has an object-side surface 121 being convex and an image-side surface 122 being concave. The second lens element 120 is made of a plastic material, and has the object-side surface 121 and the image-side surface 122 being both aspheric. Furthermore, each of the object-side surface 121 and the image-side surface 122 includes at least one inflection point.

The third lens element 130 with positive refractive power has an object-side surface 131 being convex and an image-side surface 132 being concave. The third lens element 130 is made of a plastic material, and has the object-side surface 131 and the image-side surface 132 being both aspheric.

The fourth lens element 140 with positive refractive power has an object-side surface 141 being convex and an image-side surface 142 being convex. The fourth lens element 140 is made of a plastic material, and has the object-side surface 141 and the image-side surface 142 being both aspheric.

The fifth lens element 150 with negative refractive power has an object-side surface 151 being concave and an image-side surface 152 being concave. The fifth lens element 150 is made of a plastic material, and has the object-side surface 151 and the image-side surface 152 being both aspheric. Furthermore, the image-side surface 142 of the fourth lens element 140 and the object-side surface 151 of the fifth lens element are cemented.

The sixth lens element 160 with positive refractive power has an object-side surface 161 being convex and an image-side surface 162 being convex. The sixth lens element 160 is made of a plastic material, and has the object-side surface 161 and the image-side surface 162 being both aspheric.

The IR-cut filter 170 is made of a glass material and located between the sixth lens element 160 and the image surface 180, and will not affect the focal length of the image capturing lens system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the image capturing lens system according to the 1st embodiment, when a focal length of the image capturing lens system is f, an f-number of the image capturing lens system is Fno, and half of a maximum field of view of the image capturing lens system is HFOV, these parameters have the following values: f=1.27 mm; Fno=2.45; and HFOV=75.0 degrees.

In the image capturing lens system according to the 1st embodiment, when the maximum field of view of the image capturing lens system is FOV, the following condition is satisfied: FOV=150.0 degrees.

In the image capturing lens system according to the 1st embodiment, when a maximum effective radius of the object-side surface 111 of the first lens element 110 is Y11, an entrance pupil diameter of the image capturing lens system is EPD, and a maximum image height of the image capturing lens system is ImgH (half of a diagonal length of an effective photosensitive area of the image sensor 190), the following conditions are satisfied: Y11/EPD=28.72; and Y11/ImgH=6.56.

FIG. 17 is a schematic view of the parameters Sag12_1.0Y and Sag12_0.5Y of the image capturing lens system of FIG. 1. In FIG. 17, when a displacement in parallel with an optical axis from an axial vertex on the image-side surface 112 of the first lens element 110 to a maximum effective radius position on the image-side surface 112 of the first lens element 110 is Sag12_1.0Y, and a displacement in parallel with an optical axis from an axial vertex on the image-side surface 112 of the first lens element 110 to a half of the maximum effective radius position on the image-side surface 112 of the first lens element 110 is Sag12_0.5Y, the following condition is satisfied: Sag12_1.0Y/Sag12_0.5Y=8.48.

FIG. 18 is a schematic view of the parameters Sag21 and Sag22 of the image capturing lens system of FIG. 1. In FIG. 18, when a displacement in parallel with an optical axis from an axial vertex on the object-side surface 121 of the second lens element 120 to a maximum effective radius position on the object-side surface 121 of the second lens element 120 is Sag21, a displacement in parallel with an optical axis from an axial vertex on the image-side surface 122 of the second lens element 120 to a maximum effective radius position on the image-side surface 122 of the second lens element 120 is Sag22, a central thickness of the second lens element 120 is CT2, and a maximum effective radius of the image-side surface 122 of the second lens element 120 is Y22, the following conditions are satisfied: (Sag22−Sag21)/CT2=0.78; and Sag22/Y22=1.40.

In the image capturing lens system according to the 1st embodiment, when an axial distance between the first lens element 110 and the second lens element 120 is T12, and a central thickness of the first lens element 110 is CT1, the following condition is satisfied: T12/CT1=1.65.

In the image capturing lens system according to the 1st embodiment, when a curvature radius of the object-side surface 131 of the third lens element 130 is R5, and a curvature radius of the image-side surface 132 of the third lens element 130 is R6, the following condition is satisfied: (R5+R6)/(R5−R6)=−3.67.

In the image capturing lens system according to the 1st embodiment, when the focal length of the image capturing lens system is f, a curvature radius of the object-side surface 111 of the first lens element 110 is R1, and a curvature radius of the image-side surface 112 of the first lens element 110 is R2, the following condition is satisfied: (f/|R1|)+(f/|R2|)=0.05.

In the image capturing lens system according to the 1st embodiment, when a focal length of the first lens element 110 is f1, and a focal length of the second lens element 120 is f2, the following condition is satisfied: |f2/f1|=0.02.

The detailed optical data of the 1st embodiment are shown in Table 1 and the aspheric surface data are shown in Table 2 below.

TABLE 1

1st Embodiment
f = 1.27 mm, Fno = 2.45, HFOV = 75.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 38.395 | ASP | 2.600 | Plastic | 1.511 | 56.8 | 166.76 |
| 2 | | 68.295 | ASP | 4.296 | | | | |
| 3 | Lens 2 | 4.089 | ASP | 2.500 | Plastic | 1.544 | 55.9 | −2.58 |
| 4 | | 0.820 | ASP | 3.492 | | | | |
| 5 | Lens 3 | 3.602 | ASP | 1.386 | Plastic | 1.660 | 20.4 | 10.58 |
| 6 | | 6.299 | ASP | 2.340 | | | | |
| 7 | Ape. Stop | Plano | | −0.090 | | | | |
| 8 | Lens 4 | 2.100 | ASP | 1.609 | Plastic | 1.544 | 55.9 | 1.04 |
| 9 | | −0.567 | ASP | 0.010 | Cement | 1.550 | 43.9 | |
| 10 | Lens 6 | −1.429 | ASP | 0.400 | Plastic | 1.583 | 30.2 | −2.34 |
| 11 | | 34.365 | ASP | 0.899 | | | | |
| 12 | Lens 6 | 2.999 | ASP | 2.124 | Plastic | 1.511 | 56.8 | 2.76 |
| 13 | | −2.021 | ASP | 0.400 | | | | |
| 14 | IR-cut filter | Plano | | 0.210 | Glass | 1.517 | 64.2 | — |
| 15 | | Plano | | 0.400 | | | | |
| 16 | Image | Plano | | — | | | | |

Reference wavelength is 587.6 nm (d-line).

TABLE 2

Aspheric Coefficients

| Surface # | 1 | 2 | 3 | 4 | 5 | 6 |
|---|---|---|---|---|---|---|
| k = | 3.5393E+00 | −1.0000E+00 | −2.0642E+00 | −1.2727E+00 | −1.0445E−01 | −5.1113E−01 |
| A4 = | −9.9319E−05 | 6.5405E−04 | −2.0101E−03 | 3.9676E−02 | 1.0806E−02 | 1.8853E−02 |
| A6 = | 2.8012E−06 | −3.3423E−06 | 9.9368E−05 | −1.7363E−03 | 3.3842E−04 | −8.6668E−03 |
| A8 = | −4.2161E−08 | −3.2650E−07 | −6.5184E−06 | 3.2038E−03 | −3.5971E−04 | 4.0102E−03 |
| A10 = | 3.3332E−10 | 1.1819E−08 | 2.1045E−07 | −1.3933E−03 | 1.0214E−04 | −1.0306E−03 |
| A12 = | −1.4198E−12 | −1.7798E−10 | −3.0983E−09 | 1.9280E−04 | −1.4313E−05 | 8.7339E−05 |
| A14 = | 3.1290E−16 | 1.2782E−12 | 1.7310E−11 | −8.9782E−06 | | |
| A16 = | −2.8150E−18 | −3.4632E−16 | | | | |

| Surface # | 8 | 9 | 10 | 11 | 12 | 13 |
|---|---|---|---|---|---|---|
| k = | 7.6646E−01 | −9.5535E−01 | −1.2409E+00 | 9.0000E+01 | −2.8412E+00 | −3.7863E+00 |
| A4 = | −1.0060E−02 | 4.9433E+00 | −1.6706E+00 | −6.7551E−02 | −2.2012E−02 | 7.5687E−02 |
| A6 = | −1.7817E−02 | −3.9060E+01 | 6.6228E+00 | 1.6198E−01 | 4.6926E−04 | −6.9847E−02 |
| A8 = | 1.1870E−01 | 1.3247E+02 | −1.5970E+01 | −1.9052E−01 | 4.1502E−03 | 3.1576E−02 |
| A10 = | −4.0748E−01 | −2.1849E+02 | 1.9912E+01 | 1.5285E−01 | −2.2160E−03 | −7.7341E−03 |
| A12 = | 6.1479E−01 | 1.7365E+02 | −1.0873E+01 | −6.7986E−02 | 4.6170E−04 | 9.7137E−04 |
| A14 = | −3.2584E−01 | −5.3016E+01 | 1.5080E+00 | 1.2753E−02 | −3.1447E−05 | −4.9718E−05 |
| A16 = | | | | | −1.1298E−06 | |

In Table 1, the curvature radius, the thickness and the focal length are shown in millimeters (mm). Surface numbers 0-16 represent the surfaces sequentially arranged from the object side to the image side along the optical axis. In Table 2, k represents the conic coefficient of the equation of the aspheric surface profiles. A4-A16 represent the aspheric coefficients ranging from the 4th order to the 16th order. The tables presented below for each embodiment correspond to chematic parameter and aberration curves of each embodiment, and term definitions of the tables are the same as those in Table 1 and Table 2 of the 1st embodiment. Therefore, an explanation in this regard will not be provided again.

Furthermore, in the image capturing lens system according to the 1st embodiment, when the focal length of the first lens element 110 is f1, the focal length of the second lens element 120 is f2, a focal length of the third lens element 130 is f3, a focal length of the fourth lens element 140 is f4, a focal length of the fifth lens element 150 is f5, and a focal length of the sixth lens element 160 is f6, the following conditions are satisfied: |f2|<|f1|; |f3|<|f1|; |f4|<|f1|; |f5|<|f1|; and |f6|<|f1|.

2nd Embodiment

Figure 3:
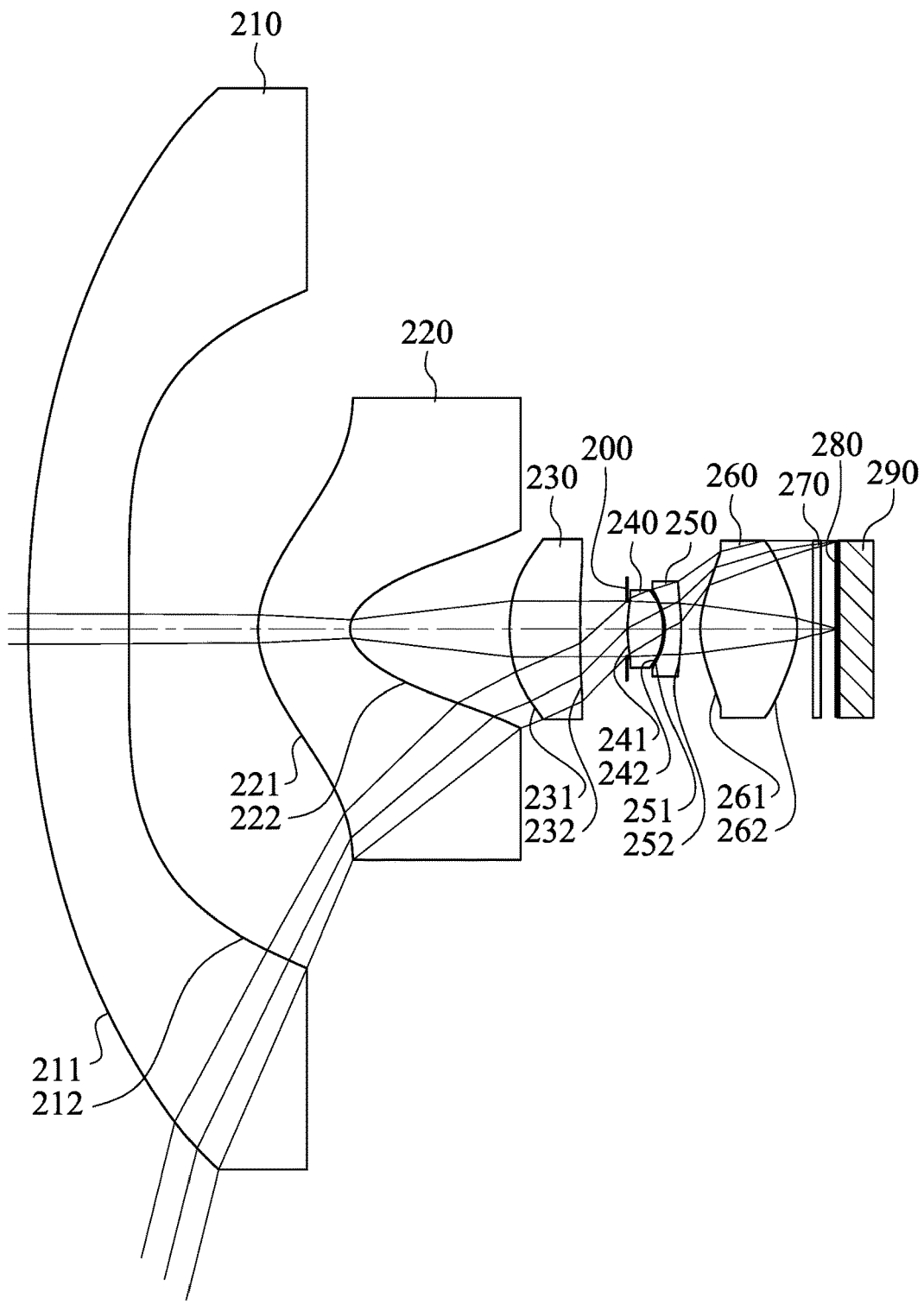
FIG. 3 is a schematic view of an image capturing apparatus according to the 2nd embodiment of the present disclosure.
Figure 4:
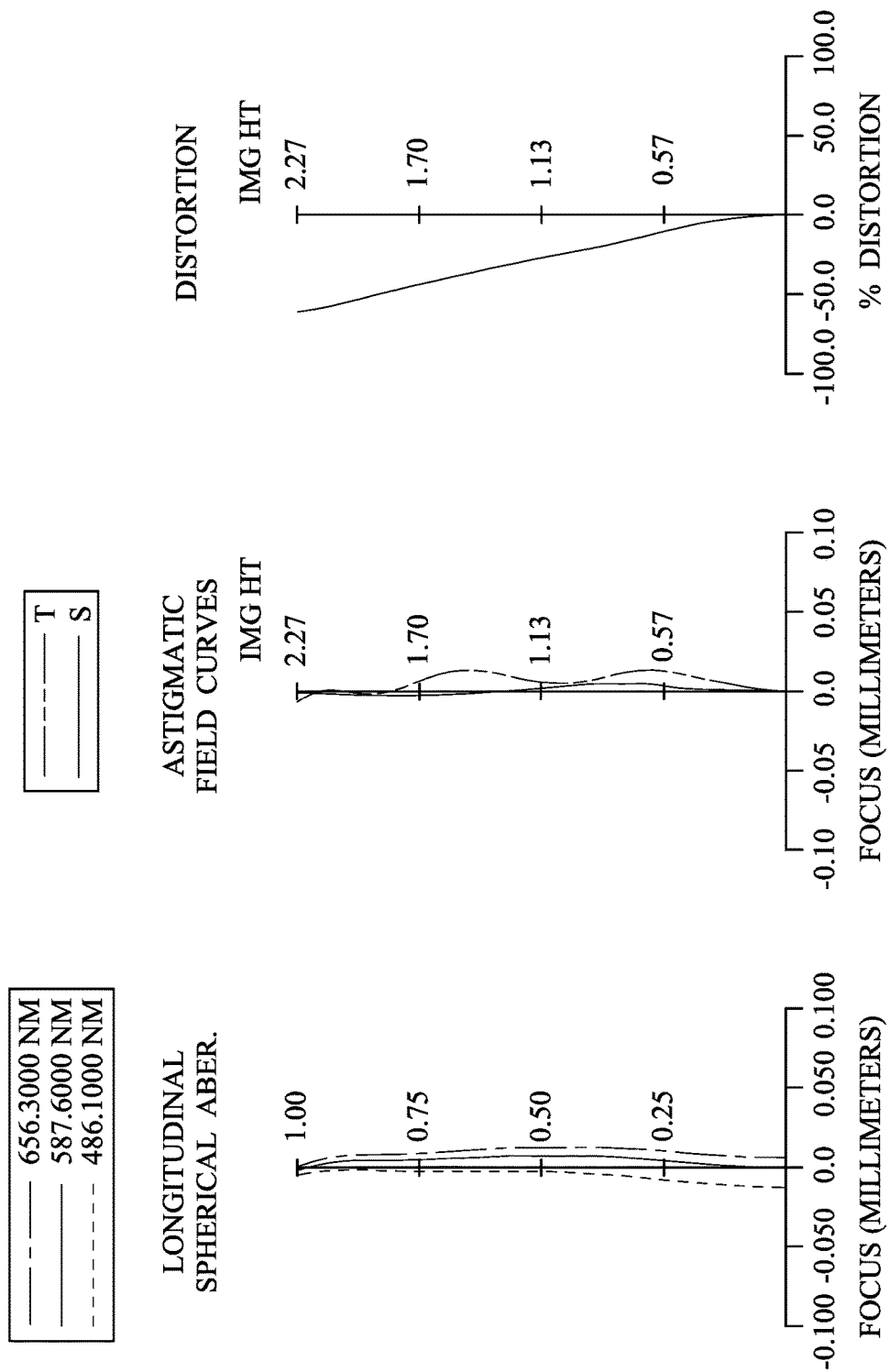
FIG. 4 shows spherical aberration curves, astigmatic field curves and a distortion curve of the image capturing apparatus according to the 2nd embodiment.

FIG. 3 is a schematic view of an image capturing apparatus according to the 2nd embodiment of the present disclosure. FIG. 4 shows spherical aberration curves, astigmatic field curves and a distortion curve of the image capturing apparatus according to the 2nd embodiment. In FIG. 3, the image capturing apparatus includes the image capturing lens system (its reference numeral is omitted) and an image sensor 290. The image capturing lens system includes, in order from an object side to an image side, a first lens element 210, a second lens element 220, a third lens element 230, an aperture stop 200, a fourth lens element 240, a fifth lens element 250, a sixth lens element 260, an IR-cut filter 270 and an image surface 280. The image sensor 290 is disposed on the image surface 280 of the image capturing lens system. The imaging optical lens system includes six lens elements (210, 220, 230, 240, 250, and 260) without additional one or more lens elements inserted between the first lens element 210 and the sixth lens element 260, wherein the lens elements (the first, second, and third lens elements) located between an imaged object and the aperture stop 200 are a front lens group, and the lens elements (the fourth, fifth and sixth lens elements) located between the aperture stop 200 and the image surface 280 are a rear lens group.

The first lens element 210 with positive refractive power has an object-side surface 211 being convex and an image-side surface 212 being planar. The first lens element 210 is made of a plastic material, and has the object-side surface 211 and the image-side surface 212 being both aspheric. Furthermore, the image-side surface 212 of the first lens element 210 includes at least one inflection point.

The second lens element 220 with negative refractive power has an object-side surface 221 being convex and an image-side surface 222 being concave. The second lens element 220 is made of a plastic material, and has the object-side surface 221 and the image-side surface 222 being both aspheric. Furthermore, each of the object-side surface 221 and the image-side surface 222 includes at least one inflection point.

The third lens element 230 with positive refractive power has an object-side surface 231 being convex and an image-side surface 232 being convex. The third lens element 230 is made of a plastic material, and has the object-side surface 231 and the image-side surface 232 being both aspheric.

The fourth lens element 240 with positive refractive power has an object-side surface 241 being convex and an image-side surface 242 being convex. The fourth lens element 240 is made of a plastic material, and has the object-side surface 241 and the image-side surface 242 being both aspheric.

The fifth lens element 250 with negative refractive power has an object-side surface 251 being concave and an image-side surface 252 being convex. The fifth lens element 250 is made of a plastic material, and has the object-side surface 251 and the image-side surface 252 being both aspheric.

The sixth lens element 260 with positive refractive power has an object-side surface 261 being convex and an image-side surface 262 being convex. The sixth lens element 260 is made of a plastic material, and has the object-side surface 261 and the image-side surface 262 being both aspheric.

The IR-cut filter 270 is made of a glass material and located between the sixth lens element 260 and the image surface 280, and will not affect the focal length of the image capturing lens system.

The detailed optical data of the 2nd embodiment are shown in Table 3 and the aspheric surface data are shown in Table 4 below.

TABLE 3

2nd Embodiment
f = 1.44 mm, Fno = 1.82, HFOV = 76.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 32.720 | ASP | 2.600 | Plastic | 1.515 | 56.5 | 63.58 |
| 2 | | ∞ | ASP | 3.310 | | | | |
| 3 | Lens 2 | 2.617 | ASP | 2.374 | Plastic | 1.544 | 55.9 | −2.85 |
| 4 | | 0.663 | ASP | 4.096 | | | | |
| 5 | Lens 3 | 4.214 | ASP | 1.822 | Plastic | 1.650 | 21.6 | 6.36 |
| 6 | | −194.851 | ASP | 1.203 | | | | |
| 7 | Ape. Stop | Plano | | 0.017 | | | | |
| 8 | Lens 4 | 3.998 | ASP | 0.915 | Plastic | 1.515 | 56.5 | 2.81 |
| 9 | | −2.094 | ASP | 0.050 | | | | |
| 10 | Lens 5 | −1.914 | ASP | 0.401 | Plastic | 1.671 | 19.5 | −3.45 |
| 11 | | −11.953 | ASP | 0.493 | | | | |
| 12 | Lens 6 | 2.117 | ASP | 2.500 | Plastic | 1.515 | 56.5 | 2.55 |
| 13 | | −2.060 | ASP | 0.400 | | | | |
| 14 | IR-cut filter | Plano | | 0.210 | Glass | 1.517 | 64.2 | — |
| 15 | | Plano | | 0.431 | | | | |
| 16 | Image | Plano | | — | | | | |

Reference wavelength is 587.6 nm (d-line).

TABLE 4

Aspheric Coefficients

| Surface # | 1 | 2 | 3 | 4 | 5 | 6 |
|---|---|---|---|---|---|---|
| k = | 3.4304E+00 | 0.0000E+00 | −1.6648E+00 | −1.0882E+00 | −2.1783E−01 | 8.9999E+01 |
| A4 = | 1.7086E−04 | 2.0090E−05 | −2.2704E−03 | 4.1882E−02 | 7.9431E−03 | 1.3736E−02 |
| A6 = | −4.1806E−06 | 6.9832E−05 | 9.5667E−05 | −1.2864E−02 | 3.6954E−03 | −8.1105E−04 |
| A8 = | 6.1761E−08 | −3.2085E−06 | −6.3229E−06 | 9.1274E−03 | −2.6039E−03 | −1.7303E−03 |
| A10 = | −5.2422E−10 | 8.0753E−08 | 2.0243E−07 | −2.8257E−03 | 1.0723E−03 | 9.2626E−04 |
| A12 = | 2.5071E−12 | −1.1863E−09 | −2.9061E−09 | 3.4535E−04 | −2.6202E−04 | −2.7182E−04 |
| A14 = | −6.3656E−15 | 9.8117E−12 | 1.5658E−11 | −1.4886E05 | 3.2548E−05 | 3.7687E−05 |
| A16 = | 6.8033E−18 | −3.5233E−14 | | | −1.6604E−06 | −1.9086E−06 |

| Surface # | 8 | 9 | 10 | 11 | 12 | 13 |
|---|---|---|---|---|---|---|
| k = | −6.3762E+00 | −1.4187E+00 | −1.5831E+00 | 3.4926E+01 | −8.2748E+00 | −4.4226E−01 |
| A4 = | 1.0331E−02 | −1.3977E−01 | −1.8794E−01 | −1.1710E−01 | 7.9862E−03 | 4.5056E−02 |
| A6 = | 8.0764E−03 | −3.3380E−02 | 1.5581E−01 | 1.7761E−01 | −3.5374E−03 | −6.8735E−03 |
| A6 = | −1.2517E−01 | 1.6964E−01 | −7.1270E−02 | −1.5604E−01 | 1.6749E−03 | 2.3322E−03 |
| A10 = | 2.8718E−01 | −2.6340E−01 | −3.8108E−02 | 9.7906E−02 | −6.6793E−04 | −5.9679E−04 |
| A12 = | −4.6361E−01 | 2.1327E−01 | 1.5087E−01 | −3.2914E−02 | 1.2091E−04 | 6.2784E−05 |
| A14 = | 2.8752E−01 | −5.6061E−02 | −6.9058E−02 | 4.7323E−03 | −7.4170E−06 | −1.5117E−06 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 1.44 | (Sag22 − Sag21)/CT2 | 0.82 |
| Fno | 1.82 | Sag22/Y22 | 1.72 |
| HFOV [deg.] | 76.2 | T12/CT1 | 1.27 |
| FOV [deg.] | 152.4 | (R5 + R6)/(R5 − R6) | −0.96 |
| Y11/EPD | 17.59 | (f/|R1|) + (f/|R2|) | 0.04 |
| Y11/ImgH | 6.14 | |f2/f1| | 0.04 |
| Sag12_1.0Y/Sag12_0.5Y | 20.65 | | |

Furthermore, in the image capturing lens system according to the 2nd embodiment, when the focal length of the first lens element 210 is f1, the focal length of the second lens element 220 is f2, a focal length of the third lens element 230 is f3, a focal length of the fourth lens element 240 is f4, a focal length of the fifth lens element 250 is f5, and a focal length of the sixth lens element 260 is f6, the following conditions are satisfied: |f2|<|f1|; |f3|<|f1|; |f4|<|f1|; |f5|<|f1|; and |f6|<|f1|.

3rd Embodiment

Figure 5:
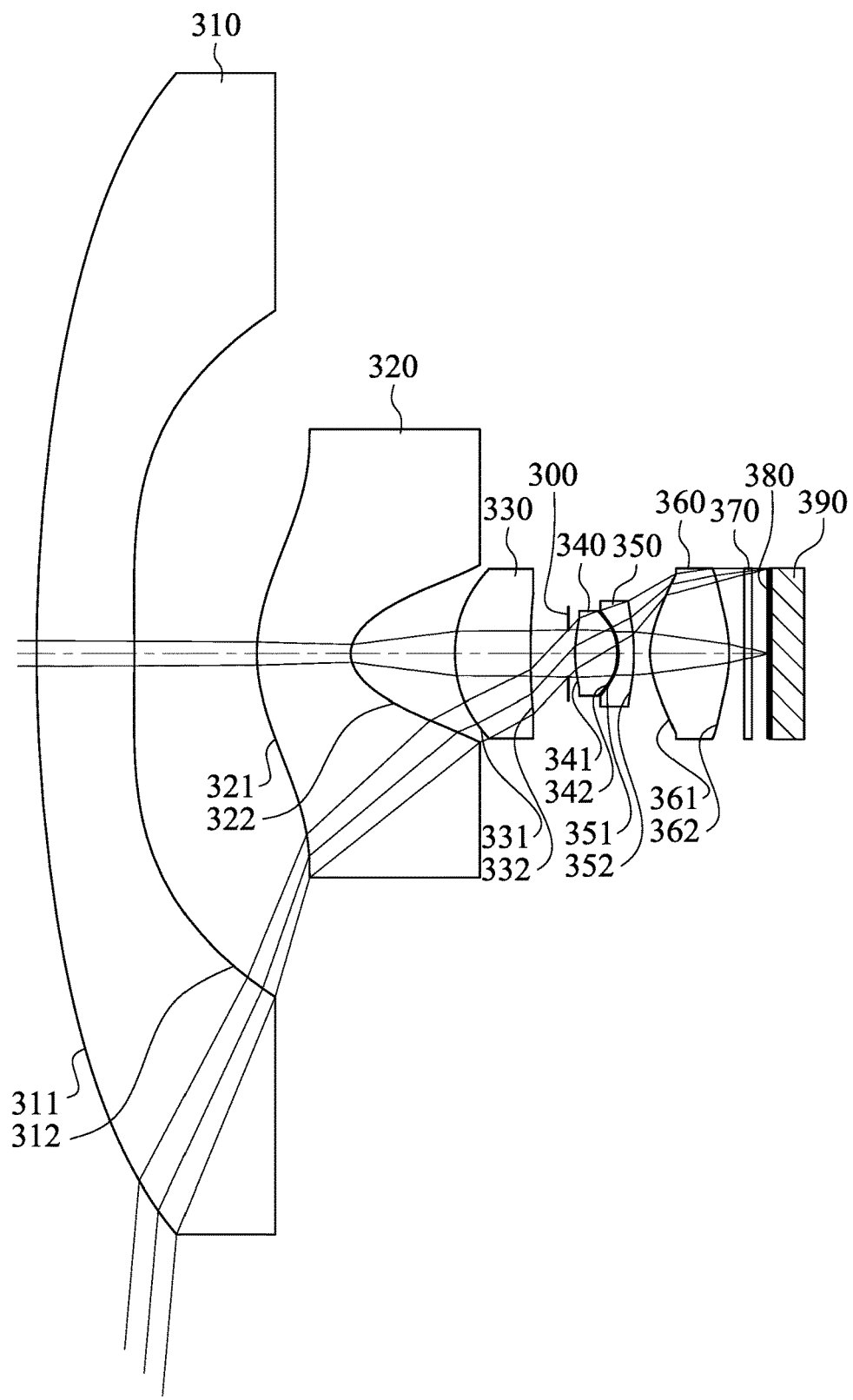
FIG. 5 is a schematic view of an image capturing apparatus according to the 3rd embodiment of the present disclosure.
Figure 6:
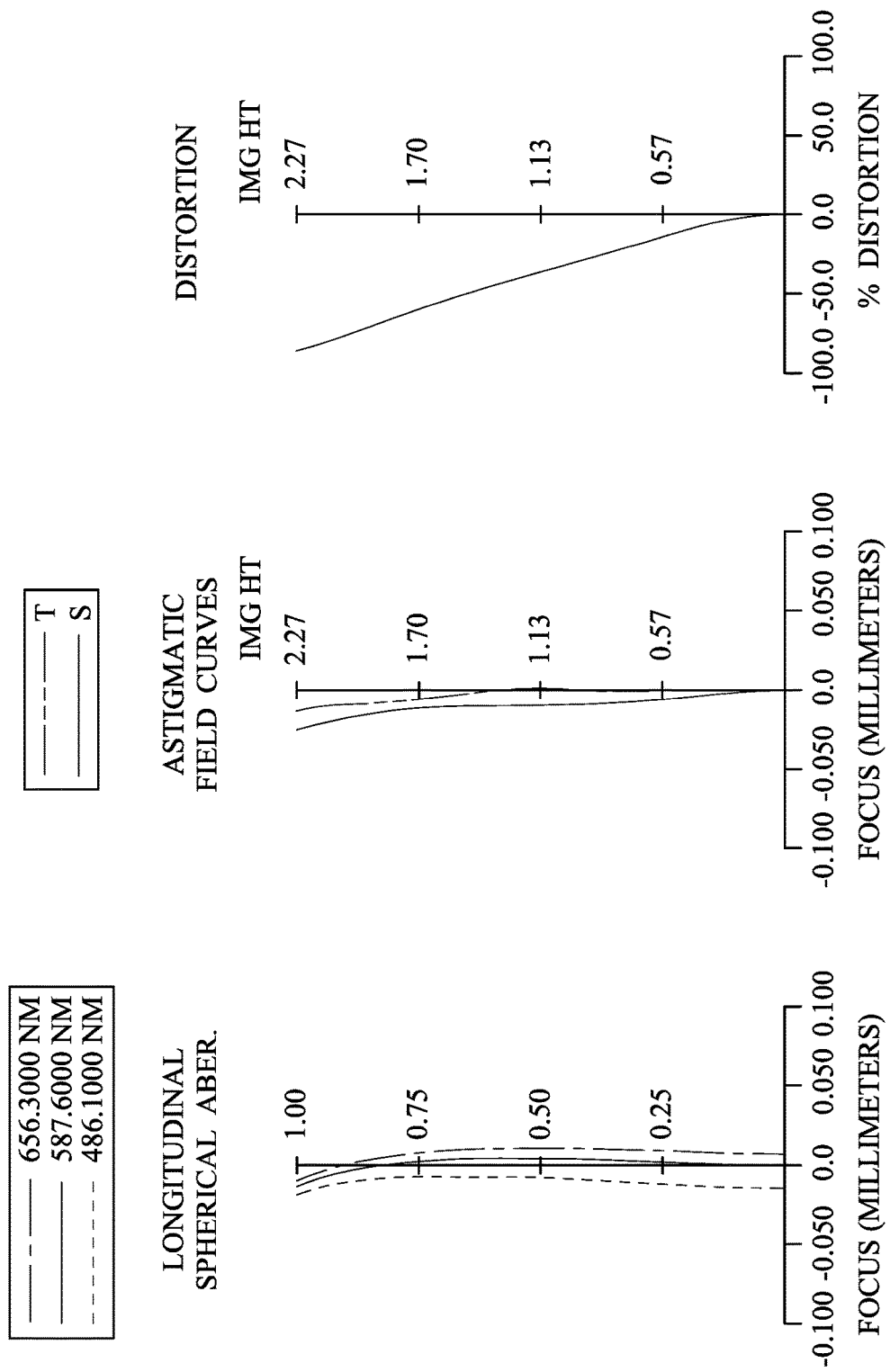
FIG. 6 shows spherical aberration curves, astigmatic field curves and a distortion curve of the image capturing apparatus according to the 3rd embodiment.

FIG. 5 is a schematic view of an image capturing apparatus according to the 3rd embodiment of the present disclosure. FIG. 6 shows spherical aberration curves, astigmatic field curves and a distortion curve of the image capturing apparatus according to the 3rd embodiment. In FIG. 5, the image capturing apparatus includes the image capturing lens system (its reference numeral is omitted) and an image sensor 390. The image capturing lens system includes, in order from an object side to an image side, a first lens element 310, a second lens element 320, a third lens element 330, an aperture stop 300, a fourth lens element 340, a fifth lens element 350, a sixth lens element 360, an IR-cut filter 370 and an image surface 380. The image sensor 390 is disposed on the image surface 380 of the image capturing lens system. The imaging optical lens system includes six lens elements (310, 320, 330, 340, 350, and 360) without additional one or more lens elements inserted between the first lens element 310 and the sixth lens element 360, wherein the lens elements (the first, second, and third lens elements) located between an imaged object and the aperture stop 300 are a front lens group, and the lens elements (the fourth, fifth, and sixth lens elements) located between the aperture stop 300 and the image surface 380 are a rear lens group.

The first lens element 310 with positive refractive power has an object-side surface 311 being convex and an image-side surface 312 being convex. The first lens element 310 is made of a plastic material, and has the object-side surface 311 and the image-side surface 312 being both aspheric. Furthermore, the image-side surface 312 of the first lens element 310 includes at least one inflection point.

The second lens element 320 with negative refractive power has an object-side surface 321 being convex and an image-side surface 322 being concave. The second lens element 320 is made of a plastic material, and has the object-side surface 321 and the image-side surface 322 being both aspheric. Furthermore, each of the object-side surface 321 and the image-side surface 322 includes at least one inflection point.

The third lens element 330 with positive refractive power has an object-side surface 331 being convex and an image-side surface 332 being concave. The third lens element 330 is made of a plastic material, and has the object-side surface 331 and the image-side surface 332 being both aspheric.

The fourth lens element 340 with positive refractive power has an object-side surface 341 being convex and an image-side surface 342 being convex. The fourth lens element 340 is made of a plastic material, and has the object-side surface 341 and the image-side surface 342 being both aspheric.

The fifth lens element 350 with negative refractive power has an object-side surface 351 being concave and an image-side surface 352 being convex. The fifth lens element 350 is made of a plastic material, and has the object-side surface 351 and the image-side surface 352 being both aspheric.

The sixth lens element 360 with positive refractive power has an object-side surface 361 being convex and an image-side surface 362 being convex. The sixth lens element 360 is made of a plastic material, and has the object-side surface 361 and the image-side surface 362 being both aspheric.

The IR-cut filter 370 is made of a glass material and located between the sixth lens element 360 and the image surface 380, and will not affect the focal length of the image capturing lens system.

The detailed optical data of the 3rd embodiment are shown in Table 5 and the aspheric surface data are shown in Table 6 below.

Moreover, these parameters can be calculated from Table 5 and Table 6 as the following values and satisfy the following conditions:

| 3rd Embodiment | | | |
|---|---|---|---|
| f [mm] | 1.37 | (Sag22 − Sag21)/CT2 | 0.81 |
| Fno | 2.05 | Sag22/Y22 | 1.45 |
| HFOV [deg.] | 85.0 | T12/CT1 | 1.25 |

TABLE 5

3rd Embodiment
f = 1.37 mm, Fno = 2.05, HFOV = 85.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 45.419 | ASP | 2.600 | Plastic | 1.545 | 56.1 | 57.77 |
| 2 | | −100.509 | ASP | 3.253 | | | | |
| 3 | Lens 2 | 4.417 | ASP | 2.500 | Plastic | 1.544 | 56.0 | −2.28 |
| 4 | | 0.775 | ASP | 2.763 | | | | |
| 5 | Lens 3 | 3.613 | ASP | 2.019 | Plastic | 1.660 | 20.4 | 5.74 |
| 6 | | 61.525 | ASP | 1.004 | | | | |
| 7 | Ape. Stop | Plano | | 0.179 | | | | |
| 8 | Lens 4 | 3.575 | ASP | 1.119 | Plastic | 1.544 | 56.0 | 2.45 |
| 9 | | −1.893 | ASP | 0.043 | | | | |
| 10 | Lens 5 | −1.802 | ASP | 0.400 | Plastic | 1.660 | 20.4 | −3.19 |
| 11 | | −13.569 | ASP | 0.432 | | | | |
| 12 | Lens 6 | 1.856 | ASP | 2.096 | Plastic | 1.544 | 56.0 | 2.73 |
| 13 | | −4.462 | ASP | 0.400 | | | | |
| 14 | IR-cut filter | Plano | | 0.210 | Glass | 1.517 | 64.2 | — |
| 15 | | Plano | | 0.465 | | | | |
| 16 | Image | Plano | | — | | | | |

Reference wavelength is 587.6 nm (d-line).

TABLE 6

Aspheric Coefficients

| Surface # | 1 | 2 | 3 | 4 | 5 | 6 |
|---|---|---|---|---|---|---|
| k = | 5.7452E+00 | −8.9987E+01 | −2.4734E+00 | −1.1503E+00 | −2.6537E−01 | −9.0000E+01 |
| A4 = | −1.6752E−05 | 1.0124E−03 | −1.6951E−03 | 5.5854E−02 | 7.9205E−03 | 1.1509E−02 |
| A6 = | 1.5342E−07 | −1.1286E−05 | 5.5835E−05 | −5.4332E−03 | −1.3121E−03 | −1.7781E−03 |
| A8 = | −4.8169E−10 | 1.0994E−07 | −2.6638E−06 | 4.0530E−04 | 7.3408E−04 | 3.7920E−04 |
| A10 = | 7.5282E−13 | −4.2365E−10 | 6.2332E−08. | −2.3918E−04 | −1.9177E−04 | 1.0891E−04 |
| A12 = | | | −4.9594E−10 | 2.3827E−05 | 2.5716E−05 | −1.3766E−04 |
| A14 = | | | | | −1.9900E−06 | 2.0935E−06 |

| Surface # | 8 | 9 | 10 | 11 | 12 | 13 |
|---|---|---|---|---|---|---|
| k = | −2.3992E+00 | −1.3791E−02 | 2.1446E−01 | −6.8999E+01 | −6.2390E+00 | 1.7850E+00 |
| A4 = | 1.3707E−03 | −1.5416E−01 | −1.9263E−01 | −1.5083E−01 | −4.4037E−03 | −1.9727E−02 |
| A6 = | −2.9643E−06 | −1.0426E−01 | 2.3140E−02 | 1.7102E−01 | 9.7457E−03 | 2.1087E−02 |
| A8 = | −2.8989E−02 | 4.1442E−01 | 2.9733E−01 | −1.1699E−01 | −5.6962E−03 | −1.1053E−02 |
| A10 = | 3.6863E−02 | −4.6065E−01 | −3.8559E−01 | 5.3450E−02 | 2.0321E−03 | 3.0777E−03 |
| A12 = | −3.3105E−02 | 2.4200E−01 | 2.3199E−01 | −1.3320E−02 | −4.6160E−04 | −5.9182E−04 |
| A14 = | 1.5990E−02 | −4.6197E−02 | −5.2438E−02 | 1.3171E−03 | 5.7993E−06 | 6.4967E−05 |
| A16 = | | | | | −3.0145E−06 | −2.9168E−06 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

-continued

| 3rd Embodiment | | | |
|---|---|---|---|
| FOV [deg.] | 170.0 | (R5 + R6)/(R5 − R6) | −1.12 |
| Y11/EPD | 23.11 | (f/|R1|) + (f/|R2|) | 0.04 |

-continued

3rd Embodiment

| | | | |
|---|---|---|---|
| Y11/ImgH | 6.81 | \|f2/f1\| | 0.04 |
| Sag12_1.0Y/Sag12_0.5Y | 14.55 | | |

Furthermore, in the image capturing lens system according to the 3rd embodiment, when the focal length of the first lens element 310 is f1, the focal length of the second lens element 320 is f2, a focal length of the third lens element 330 is f3, a focal length of the fourth lens element 340 is f4, a focal length of the fifth lens element 350 is f5, and a focal length of the sixth lens element 360 is f6, the following conditions are satisfied: $|f2|<|f1|$; $|f3|<|f1|$; $|f4|<|f1|$; $|f5|<|f1|$; and $|f6|<|f1|$.

4th Embodiment

Figure 7:
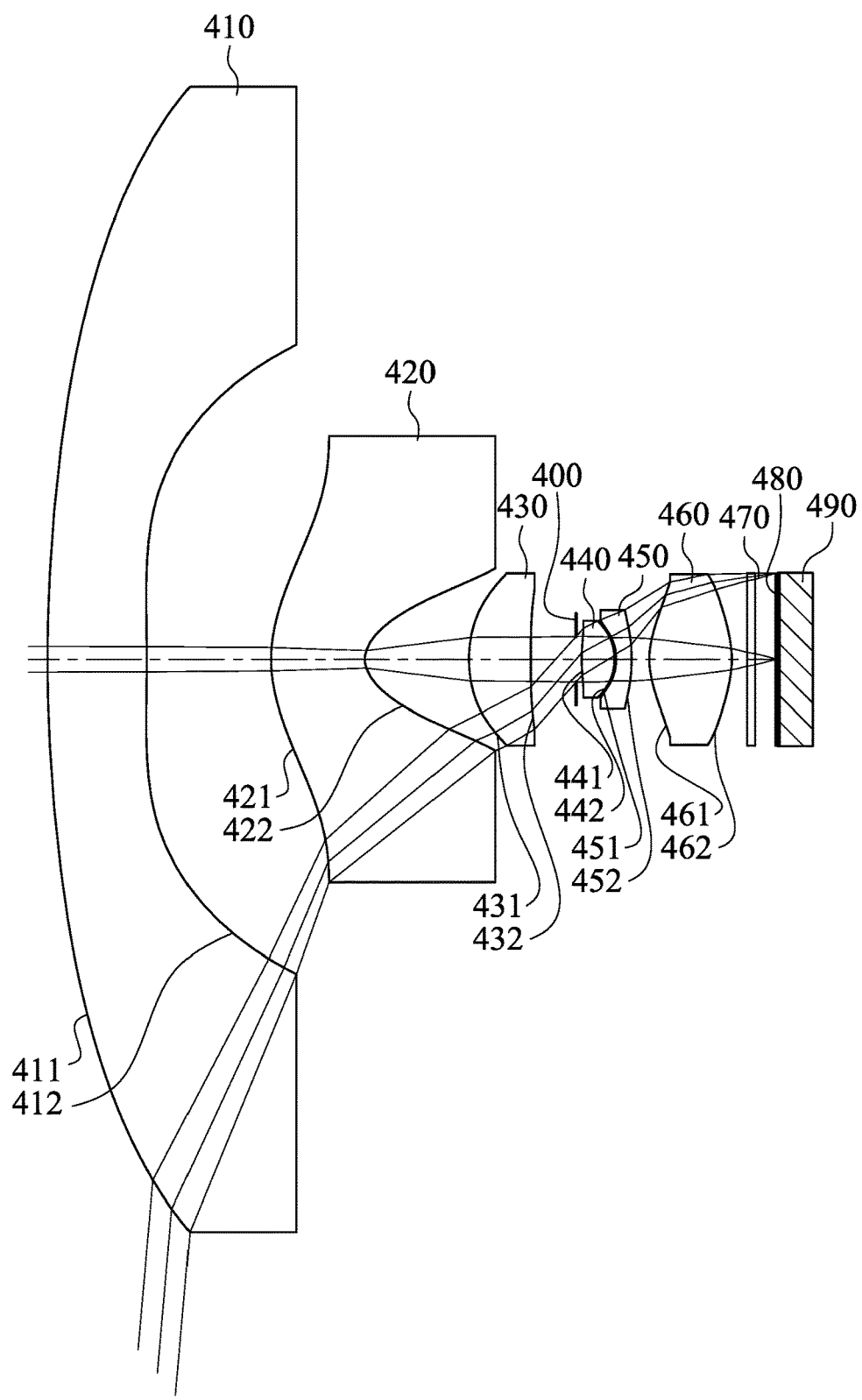
FIG. 7 is a schematic view of an image capturing apparatus according to the 4th embodiment of the present disclosure.
Figure 8:
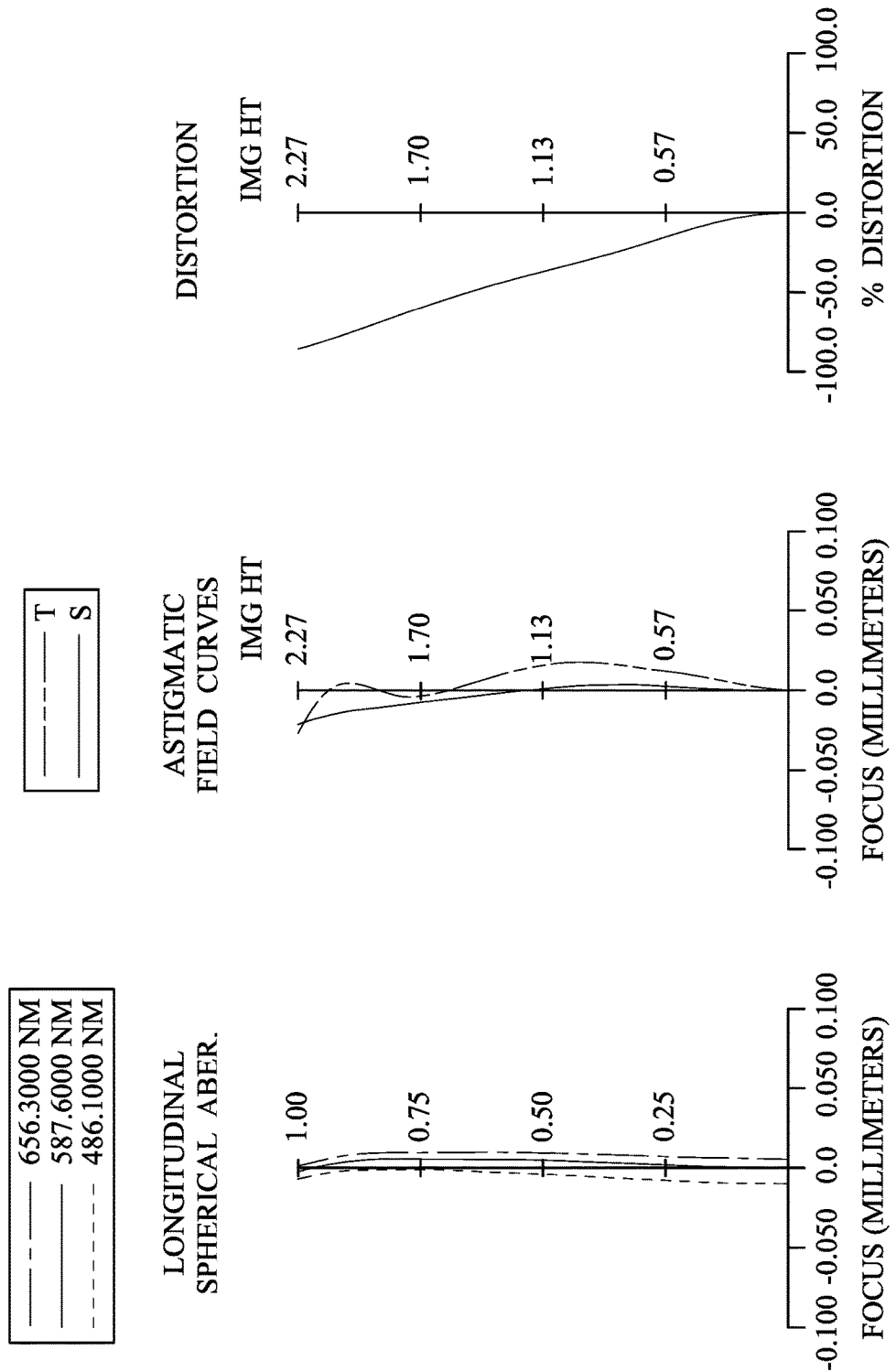
FIG. 8 shows spherical aberration curves, astigmatic field curves and a distortion curve of the image capturing apparatus according to the 4th embodiment.

FIG. 7 is a schematic view of an image capturing apparatus according to the 4th embodiment of the present disclosure. FIG. 8 shows spherical aberration curves, astigmatic field curves and a distortion curve of the image capturing apparatus according to the 4th embodiment. In FIG. 7, the image capturing apparatus includes the image capturing lens system (its reference numeral is omitted) and an image sensor 490. The image capturing lens system includes, in order from an object side to an image side, a first lens element 410, a second lens element 420, a third lens element 430, an aperture stop 400, a fourth lens element 440, a fifth lens element 450, a sixth lens element 460, an IR-cut filter 470 and an image surface 480. The image sensor 490 is disposed on the image surface 480 of the image capturing lens system. The imaging optical lens system includes six lens elements (410, 420, 430, 440, 450, and 460) without additional one or more lens elements inserted between the first lens element 410 and the sixth lens element 460, wherein the lens elements (the first, second, and third lens elements) located between an imaged object and the aperture stop 400 are a front lens group, and the lens elements (the fourth, fifth, and sixth lens elements) located between the aperture stop 400 and the image surface 480 are a rear lens group.

The first lens element 410 with positive refractive power has an object-side surface 411 being convex and an image-side surface 412 being convex. The first lens element 410 is made of a plastic material, and has the object-side surface 411 and the image-side surface 412 being both aspheric. Furthermore, the image-side surface 412 of the first lens element 410 includes at least one inflection point.

The second lens element 420 with negative refractive power has an object-side surface 421 being convex and an image-side surface 422 being concave. The second lens element 420 is made of a plastic material, and has the object-side surface 421 and the image-side surface 422 being both aspheric. Furthermore, each of the object-side surface 421 and the image-side surface 422 includes at least one inflection point.

The third lens element 430 with positive refractive power has an object-side surface 431 being convex and an image-side surface 432 being concave. The third lens element 430 is made of a plastic material, and has the object-side surface 431 and the image-side surface 432 being both aspheric.

The fourth lens element 440 with positive refractive power has an object-side surface 441 being convex and an image-side surface 442 being convex. The fourth lens element 440 is made of a plastic material, and has the object-side surface 441 and the image-side surface 442 being both aspheric.

The fifth lens element 450 with negative refractive power has an object-side surface 451 being concave and an image-side surface 452 being convex. The fifth lens element 450 is made of a plastic material, and has the object-side surface 451 and the image-side surface 452 being both aspheric.

The sixth lens element 460 with positive refractive power has an object-side surface 461 being convex and an image-side surface 462 being convex. The sixth lens element 460 is made of a plastic material, and has the object-side surface 461 and the image-side surface 462 being both aspheric.

The IR-cut filter 470 is made of a glass material and located between the sixth lens element 460 and the image surface 480, and will not affect the focal length of the image capturing lens system.

The detailed optical data of the 4th embodiment are shown in Table 7 and the aspheric surface data are shown in Table 8 below.

TABLE 7

4th Embodiment
f = 1.38 mm, Fno = 2.05, HFOV = 85.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 42.949 | ASP | 2.600 | Plastic | 1.545 | 56.1 | 50.23 |
| 2 | | −73.853 | ASP | 3.251 | | | | |
| 3 | Lens 2 | 3.840 | ASP | 2.460 | Plastic | 1.544 | 56.0 | −2.23 |
| 4 | | 0.714 | ASP | 2.717 | | | | |
| 5 | Lens 3 | 3.328 | ASP | 1.623 | Plastic | 1.660 | 20.4 | 5.20 |
| 6 | | 90.699 | ASP | 1.191 | | | | |
| 7 | Ape. Stop | Plano | | 0.145 | | | | |
| 8 | Lens 4 | 4.973 | ASP | 0.861 | Plastic | 1.544 | 56.0 | 2.26 |
| 9 | | −1.535 | ASP | 0.045 | | | | |
| 10 | Lens 5 | −1.433 | ASP | 0.400 | Plastic | 1.660 | 20.4 | −2.74 |
| 11 | | −7.656 | ASP | 0.466 | | | | |
| 12 | Lens 6 | 1.999 | ASP | 2.152 | Plastic | 1.544 | 56.0 | 2.52 |
| 13 | | −2.723 | ASP | 0.400 | | | | |
| 14 | IR-cut filter | Plano | | 0.210 | Glass | 1.517 | 64.2 | — |
| 15 | | Plano | | 0.592 | | | | |
| 16 | Image | Plano | | — | | | | |

Reference wavelength. is 587.6 nm (d-line).

TABLE 8

Aspheric Coefficients

| Surface # | 1 | 2 | 3 | 4 | 5 | 6 |
|---|---|---|---|---|---|---|
| k = | 5.3308E+00 | 7.1197E+01 | −2.5951E+00 | −1.2059E+00 | −3.1102E−01 | 8.9999E+01 |
| A4 = | −2.6494E−05 | 1.2952E−03 | −1.8911E−03 | 4.5852E−02 | 5.6688E−03 | 1.2184E−02 |
| A6 = | 3.2901E−07 | 2.0054E−06 | 9.8827E−05 | −1.3971E−02 | 1.7429E−03 | −3.3692E−03 |
| A8 = | −1.4444E−09 | 4.4112E−07 | −6.3260E−06 | 9.0364E−03 | −3.9092E−04 | 1.4400E−03 |
| A10 = | 2.8353E−12 | 7.7468E−09 | 2.0130E−07 | −2.7916E−03 | 4.2781E−05 | −3.5970E−04 |
| A12 = | −1.2455E−15 | −3.8829E−11 | −2.9061E−09 | 3.4535E−04 | −6.0322E−06 | 2.7068E−05 |
| A14 = | | | 1.5658E−11 | −1.4886E−05 | | |

| Surface # | 8 | 9 | 10 | 11 | 12 | 13 |
|---|---|---|---|---|---|---|
| k = | −9.2614E+00 | −6.2135E−01 | −7.3366E−01 | 2.3356E+01 | 7.5661E+00 | 6.8020E−02 |
| A4 = | −6.7861E−04 | −1.5620E−01 | −2.0476E−01 | −1.3341E−01 | 6.9879E−03 | 3.9984E−02 |
| A6 = | −2.9873E−02 | 1.0305E−02 | 1.8793E−01 | 1.8436E−01 | −3.4613E−03 | −7.4578E−03 |
| A8 = | −7.6916E−02 | 1.6640E−01 | −4.5616E−02 | −1.5842E−01 | 1.6455E−03 | 2.2366E−03 |
| A10 = | 2.6636E−01 | −2.6630E−01 | −5.7478E−02 | 9.6686E−02 | −6.6785E−04 | −5.6186E−04 |
| A12 = | −4.6361E−01 | 2.1327E−01 | 1.5087E−01 | −3.2914E−02 | 1.2091E−04 | 6.2784E−05 |
| A14 = | 2.8752E−01 | −5.6061E−02 | −6.9058E−02 | 4.7323E−03 | −7.4170E−06 | −1.5117E−06 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 1.38 | (Sag22 − Sag21)/CT2 | 0.77 |
| Fno | 2.05 | Sag22/Y22 | 1.43 |
| HFOV [deg.] | 85.0 | T12/CT1 | 1.25 |
| FOV [deg.] | 170.0 | (R5 + R6)/(R5 − R6) | −1.08 |
| Y11/EPD | 22.29 | (f/|R1|) + (f/|R2|) | 0.05 |
| Y11/ImgH | 6.62 | |f2/f1| | 0.04 |
| Sag12_1.0Y/Sag12_0.5Y | 16.65 | | |

Furthermore, in the image capturing lens system according to the 4th embodiment, when the focal length of the first lens element 410 is f1, the focal length of the second lens element 420 is f2, a focal length of the third lens element 430 is f3, a focal length of the fourth lens element 440 is f4, a focal length of the fifth lens element 450 is f5, and a focal length of the sixth lens element 460 is f6, the following conditions are satisfied: |f2|<|f1|; |f3|<|f1|; |f4|<|f1|; |f5|<|f1|; and |f6|<|f1|.

5th Embodiment

Figure 9:
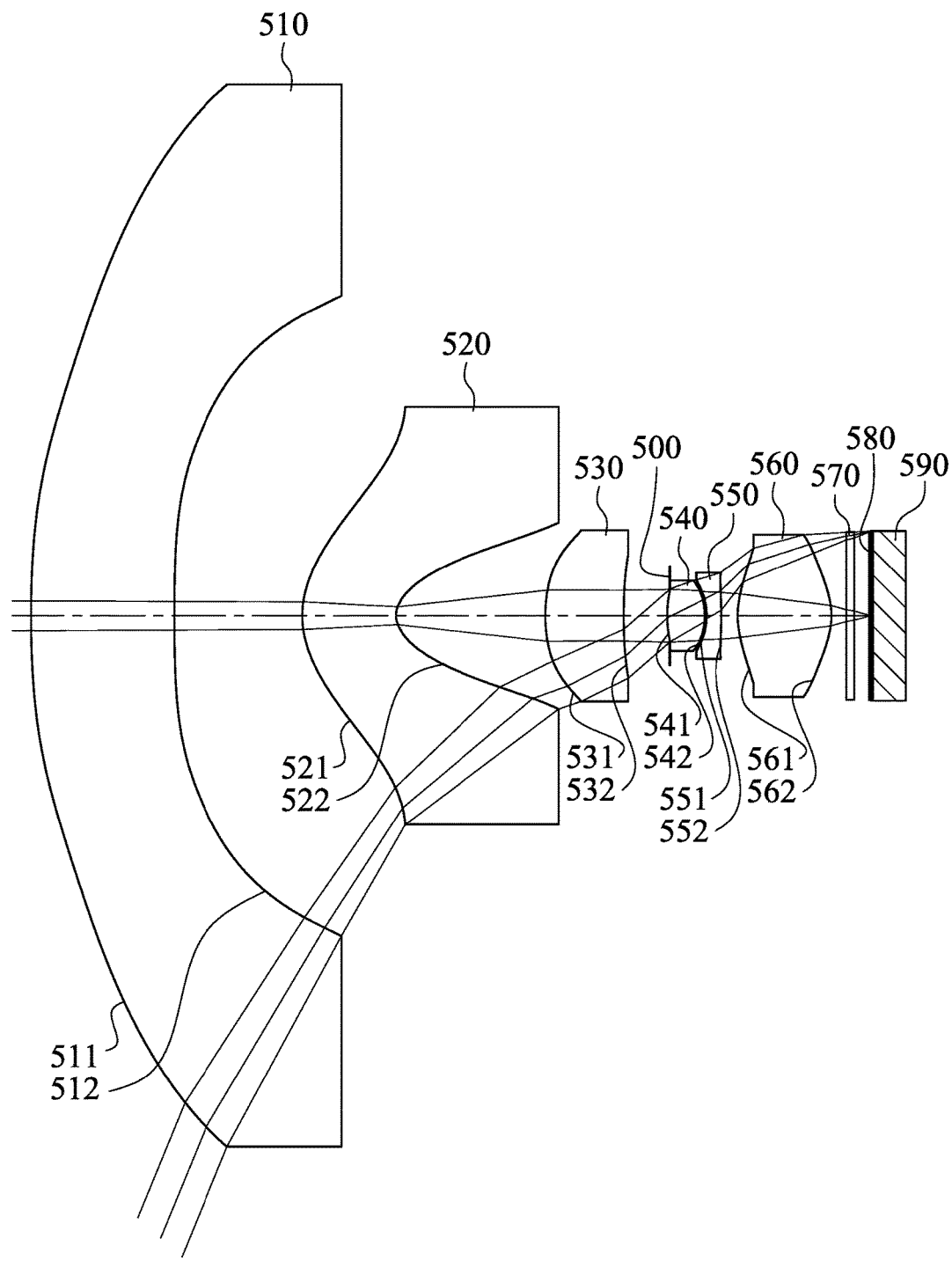
FIG. 9 is a schematic view of an image capturing apparatus according to the 5th embodiment of the present disclosure.
Figure 10:
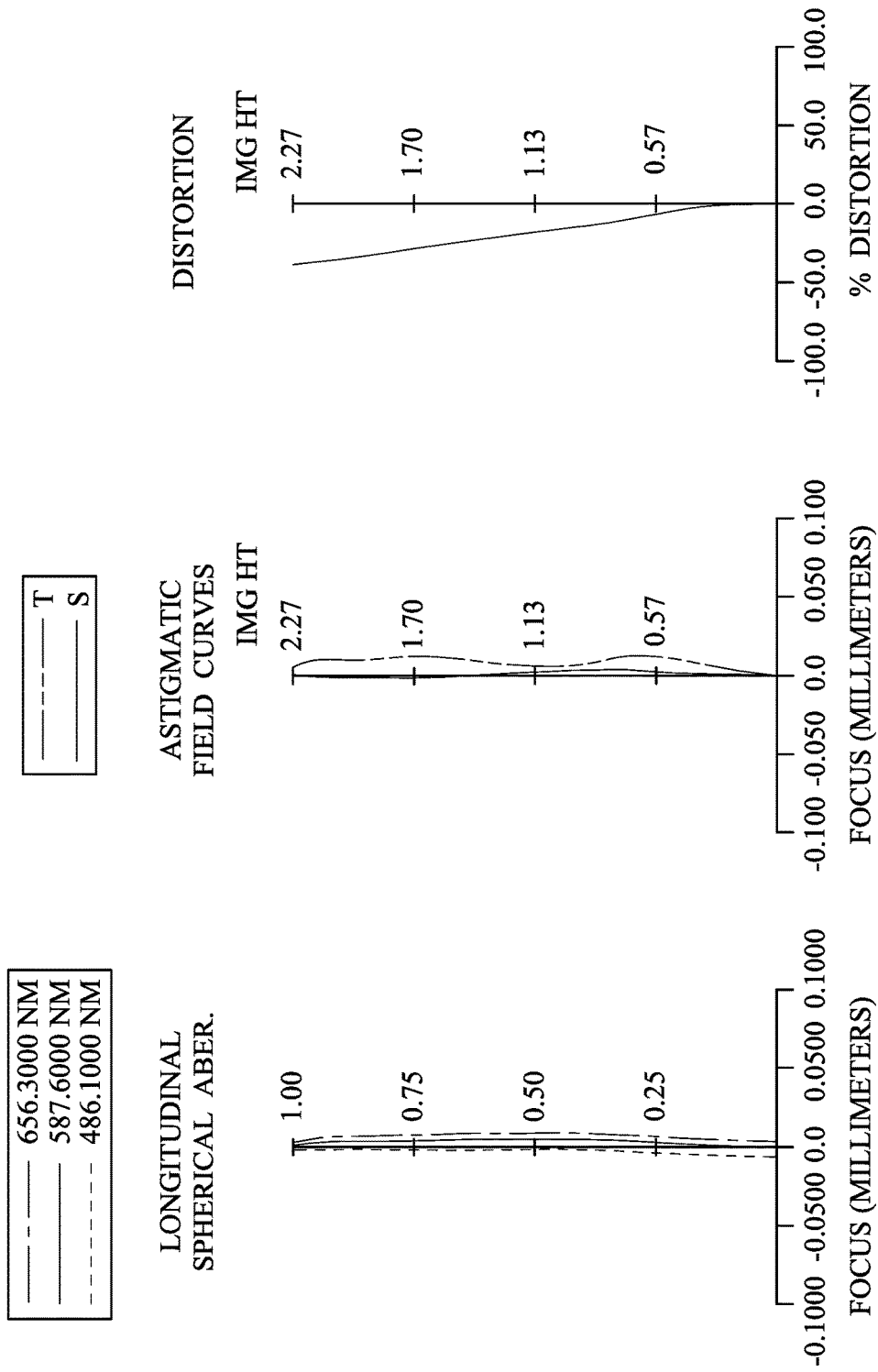
FIG. 10 shows spherical aberration curves, astigmatic field curves and a distortion curve of the image capturing apparatus according to the 5th embodiment.

FIG. 9 is a schematic view of an image capturing apparatus according to the 5th embodiment of the present disclosure. FIG. 10 shows spherical aberration curves, astigmatic field curves and a distortion curve of the image capturing apparatus according to the 5th embodiment. In FIG. 9, the image capturing apparatus includes the image capturing lens system (its reference numeral is omitted) and an image sensor 690. The image capturing lens system includes, in order from an object side to an image side, a first lens element 510, a second lens element 520, a third lens element 530, an aperture stop 500, a fourth lens element 540, a fifth lens element 550, a sixth lens element 560, an IR-cut filter 570 and an image surface 580. The image sensor 590 is disposed on the image surface 580 of the image capturing lens system. The imaging optical lens system includes six lens elements (510, 520, 530, 540, 550, and 560) without additional one or more lens elements inserted between the first lens element 510 and the sixth lens element 560, wherein the lens elements (the first, second, and third lens elements) located between an imaged object and the aperture stop 500 are a front lens group, and the lens elements (the fourth, fifth, and sixth lens elements) located between the aperture stop 500 and the image surface 580 are a rear lens group.

The first lens element 510 with positive refractive power has an object-side surface 511 being convex and an image-side surface 512 being concave. The first lens element 510 is made of a plastic material, and has the object-side surface 511 and the image-side surface 512 being both aspheric. Furthermore, the image-side surface 512 of the first lens element 510 includes at least one inflection point.

The second lens element 520 with negative refractive power has an object-side surface 521 being convex and an image-side surface 522 being concave. The second lens element 520 is made of a plastic material, and has the object-side surface 521 and the image-side surface 522 being both aspheric. Furthermore, each of the object-side surface 521 and the image-side surface 522 includes at least one inflection point.

The third lens element 530 with positive refractive power has an object-side surface 531 being convex and an image-side surface 532 being concave. The third lens element 530 is made of a plastic material, and has the object-side surface 531 and the image-side surface 532 being both aspheric.

The fourth lens element 540 with positive refractive power has an object-side surface 541 being convex and an image-side surface 542 being convex. The fourth lens element 540 is made of a plastic material, and has the object-side surface 541 and the image-side surface 542 being both aspheric.

The fifth lens element 550 with negative refractive power has an object-side surface 551 being concave and an image-side surface 552 being convex. The fifth lens element 550 is made of a plastic material, and has the object-side surface 551 and the image-side surface 552 being both aspheric.

The sixth lens element 560 with positive refractive power has an object-side surface 561 being convex and an image-side surface 562 being convex. The sixth lens element 560 is made of a plastic material, and has the object-side surface 561 and the image-side surface 562 being both aspheric.

The IR-cut filter 570 is made of a glass material and located between the sixth lens element 560 and the image surface 580, and will not affect the focal length of the image capturing lens system.

The detailed optical data of the 5th embodiment are shown in Table 9 and the aspheric surface data are shown in Table 10 below.

Moreover, these parameters can be calculated from Table 9 and Table 10 as the following values and satisfy the following conditions:

| 5th Embodiment | | | |
|---|---|---|---|
| f [mm] | 1.51 | (Sag22 − Sag21)/CT2 | 0.64 |
| Fno | 1.90 | Sag22/Y22 | 1.74 |
| HFOV [deg.] | 67.7 | T12/CT1 | 0.90 |
| FOV [deg.] | 135.4 | (R5 + R6)/(R5 − R6) | −1.30 |

TABLE 9

5th Embodiment
f = 1.51 mm, Fno = 1.90, HFOV = 67.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 30.947 | ASP | 3.819 | Plastic | 1.515 | 56.5 | 117.15 |
| 2 | | 60.926 | ASP | 3.422 | | | | |
| 3 | Lens 2 | 2.573 | ASP | 2.500 | Plastic | 1.544 | 55.9 | −3.20 |
| 4 | | 0.682 | ASP | 3.990 | | | | |
| 5 | Lens 3 | 4.174 | ASP | 2.092 | Plastic | 1.633 | 23.4 | 7.38 |
| 6 | | 31.754 | ASP | 1.226 | | | | |
| 7 | Ape. Stop | Plano | | −0.070 | | | | |
| 8 | Lens 4 | 3.093 | ASP | 1.002 | Plastic | 1.515 | 56.5 | 2.41 |
| 9 | | −1.846 | ASP | 0.050 | | | | |
| 10 | Lens 5 | −1.879 | ASP | 0.400 | Plastic | 1.650 | 21.5 | −2.93 |
| 11 | | −144.886 | ASP | 0.439 | | | | |
| 12 | Lens 6 | 2.210 | ASP | 2.500 | Plastic | 1.515 | 56.5 | 2.54 |
| 13 | | −1.979 | ASP | 0.400 | | | | |
| 14 | IR-cut filter | Plano | | 0.210 | Glass | 1.517 | 64.2 | — |
| 15 | | Plano | | 0.442 | | | | |
| 16 | Image | Plano | | — | | | | |

Reference wavelength is 587.6 nm (d-line).

TABLE 10

Aspheric Coefficients

| Surface # | 1 | 2 | 3 | 4 | 5 | 6 |
|---|---|---|---|---|---|---|
| k = | 2.4252E+00 | 0.0000E+00 | 1.2318E+00 | −1.0761E+00 | 3.2543E−01 | 8.9999E+01 |
| A4 = | 6.5262E−04 | 9.3806E−04 | −2.8308E−03 | 3.8617E−02 | 8.1768E−03 | 1.6977E−02 |
| A6 = | −1.7997E−06 | 2.7661E−05 | 8.8536E−06 | −1.1602E−02 | 3.0838E−03 | −4.6840E−04 |
| A8 = | 2.3287E−07 | −2.5889E−06 | −6.3116E−06 | 9.2601E−03 | −1.7969E−03 | −1.2078E−03 |
| A10 = | −1.6954E−09 | 8.0726E−08 | 2.0519E−07 | −2.8593E−03 | 7.0925E−04 | 7.3746E−04 |
| A12 = | 7.1795E−12 | −1.3046E−09 | −2.9061E−09 | 3.4535E−04 | −1.6635E−04 | −3.5064E−04 |
| A14 = | −1.6643E−14 | 1.1368E−11 | 1.5658E−11 | −1.4886E−05 | 2.1033E−05 | 4.8271E−05 |
| A16 = | 1.6526E−17 | −4.2056E−14 | | | −1.2354E−06 | 2.8330E−07 |

| Surface # | 8 | 9 | 10 | 11 | 12 | 13 |
|---|---|---|---|---|---|---|
| k = | −2.8894E+00 | −7.3323E+00 | −9.3765E+00 | 9.0000E+01 | −9.9554E+00 | −4.8007E−01 |
| A4 = | 1.3954E−02 | −1.1623E−01 | −1.9252E−01 | −1.0167E−01 | 8.0736E−03 | 5.4430E−02 |
| A6 = | −7.7510E−03 | −1.1945E−01 | 1.2161E−01 | 1.6124E−01 | −3.7224E−03 | −8.6031E−03 |
| A8 = | −8.8855E−02 | 1.7524E−01 | −1.1937E−01 | −1.4700E−01 | 1.6014E−03 | 2.4383E−03 |
| A10 = | 2.4994E−01 | −2.5634E−01 | −2.4797E−03 | 9.6538E−02 | −6.4009E−04 | −5.9825E−04 |
| A12 = | −4.6361E−01 | 2.1327E−01 | 1.5087E−01 | −3.2914E−02 | 1.2091E−04 | 6.2784E−05 |
| A14 = | 2.8752E−01 | −5.6061E−02 | −6.9058E−02 | 4.7323E−03 | −7.4170E−06 | −1.5117E−06 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

-continued

| 5th Embodiment | | | |
|---|---|---|---|
| Y11/EPD | 17.86 | (f/|R1|) + (f/|R2|) | 0.07 |
| Y11/ImgH | 6.26 | |f2/f1| | 0.03 |
| Sag12_1.0Y/Sag12_0.5Y | 9.55 | | |

Furthermore, in the image capturing lens system according to the 6th embodiment, when the focal length of the first lens element 510 is f1, the focal length of the second lens element 520 is f2, a focal length of the third lens element 530 is f3, a focal length of the fourth lens element 540 is f4, a focal length of the fifth lens element 550 is f5, and a focal length of the sixth lens element 560 is f6, the following conditions are satisfied: $|f2|<|f1|$; $|f3|<|f1|$; $|f4|<|f1|$; $|f5|<|f1|$; and $|f6|<|f1|$.

6th Embodiment

Figure 11:
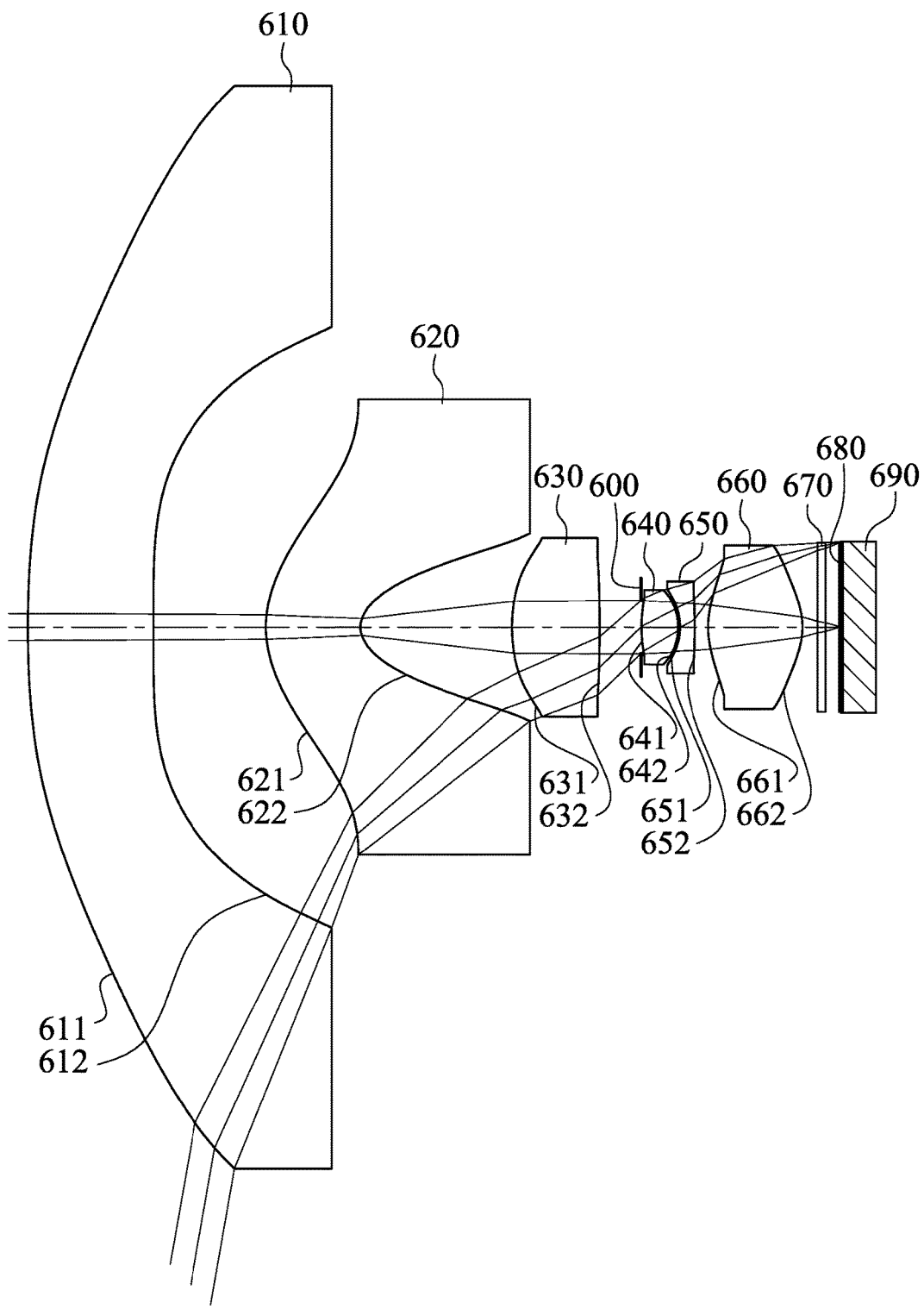
FIG. 11 is a schematic view of an image capturing apparatus according to the 6th embodiment of the present disclosure.
Figure 12:
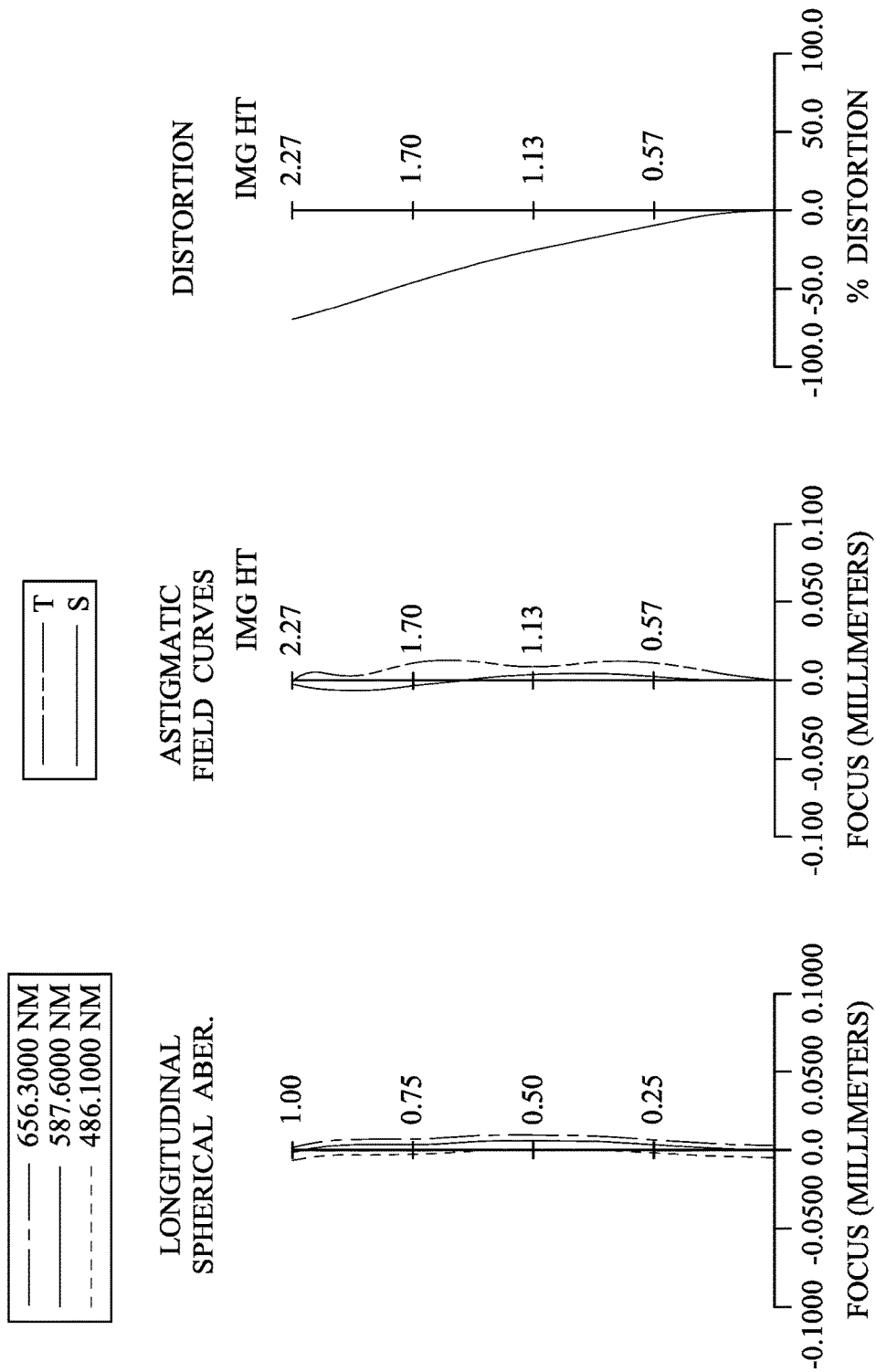
FIG. 12 shows spherical aberration curves, astigmatic field curves and a distortion curve of the image capturing apparatus according to the 6th embodiment.

FIG. 11 is a schematic view of an image capturing apparatus according to the 6th embodiment of the present disclosure. FIG. 12 shows spherical aberration curves, astigmatic field curves and a distortion curve of the image capturing apparatus according to the 6th embodiment. In FIG. 11, the image capturing apparatus includes the image capturing lens system (its reference numeral is omitted) and an image sensor 690. The image capturing lens system includes, in order from an object side to an image side, a first lens element 610, a second lens element 620, a third lens element 630, an aperture stop 600, a fourth lens element 640, a fifth lens element 650, a sixth lens element 660, an IR-cut filter 670 and an image surface 680. The image sensor 690 is disposed on the image surface 680 of the image capturing lens system. The imaging optical lens system includes six lens elements (610, 620, 630, 640, 650, and 660) without additional one or more lens elements inserted between the first lens element 610 and the sixth lens element 660, wherein the lens elements (the first, second, and third lens elements) located between an imaged object and the aperture stop 600 are a front lens group, and the lens elements (the fourth, fifth, and sixth lens elements) located between the aperture stop 600 and the image surface 680 are a rear lens group.

The first lens element 610 with positive refractive power has an object-side surface 611 being convex and an image-side surface 612 being concave. The first lens element 610 is made of a plastic material, and has the object-side surface 611 and the image-side surface 612 being both aspheric. Furthermore, the image-side surface 612 of the first lens element 610 includes at least one inflection point.

The second lens element 620 with negative refractive power has an object-side surface 621 being convex and an image-side surface 622 being concave. The second lens element 620 is made of a plastic material, and has the object-side surface 621 and the image-side surface 622 being both aspheric. Furthermore, each of the object-side surface 621 and the mage-side surface 622 includes at least one inflection point.

The third lens element 630 with positive refractive power has an object-side surface 631 being convex and an image-side surface 632 being convex. The third lens element 630 is made of a plastic material, and has the object-side surface 631 and the image-side surface 632 being both aspheric.

The fourth lens element 640 with positive refractive power has an object-side surface 641 being convex and an image-side surface 642 being convex. The fourth lens element 640 is made of a plastic material, and has the object-side surface 641 and the image-side surface 642 being both aspheric.

The fifth lens element 650 with negative refractive power has an object-side surface 651 being concave and an image-side surface 652 being planar. The fifth lens element 650 is made of a plastic material, and has the object-side surface 651 and the image-side surface 652 being both aspheric.

The sixth lens element 660 with positive refractive power has an object-side surface 661 being convex and an image-side surface 662 being convex. The sixth lens element 660 is made of a plastic material, and has the object-side surface 661 and the image-side surface 662 being both aspheric.

The IR-cut filter 670 is made of a glass material and located between the sixth lens element 660 and the image surface 680, and will not affect the focal length of the image capturing lens system.

The detailed optical data of the 6th embodiment are shown in Table 11 and the aspheric surface data are shown in Table 12 below.

TABLE 11

6th Embodiment
f = 1.32 mm, Fno = 1.85, HFOV = 80.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 30.010 | ASP | 3.319 | Plastic | 1.515 | 56.5 | 65.46 |
| 2 | | 264.705 | ASP | 2.993 | | | | |
| 3 | Lens 2 | 3.027 | ASP | 2.500 | Plastic | 1.544 | 55.9 | −2.62 |
| 4 | | 0.687 | ASP | 4.027 | | | | |
| 5 | Lens 3 | 4.655 | ASP | 2.320 | Plastic | 1.633 | 23.4 | 6.24 |
| 6 | | −21.012 | ASP | 1.090 | | | | |
| 7 | Ape. Stop | Plano | | 0.015 | | | | |
| 8 | Lens 4 | 3.695 | ASP | 0.970 | Plastic | 1.515 | 56.5 | 2.27 |
| 9 | | −1.560 | ASP | 0.050 | | | | |
| 10 | Lens 5 | −1.625 | ASP | 0.400 | Plastic | 1.650 | 21.5 | −2.50 |
| 11 | | ∞ | ASP | 0.354 | | | | |
| 12 | Lens 6 | 2.133 | ASP | 2.500 | Plastic | 1.515 | 56.5 | 2.48 |
| 13 | | −1.905 | ASP | 0.400 | | | | |
| 14 | IR-cut filter | Plano | | 0.210 | Glass | 1.517 | 64.2 | — |
| 15 | | Plano | | 0.409 | | | | |
| 16 | Image | Plano | | — | | | | |

Reference wavelength is 587.6 nm (d-line).

TABLE 12

Aspheric Coefficients

| Surface # | 1 | 2 | 3 | 4 | 5 | 6 |
|---|---|---|---|---|---|---|
| k = | 1.9304E+00 | 0.0000E+00 | −1.1834E+00 | −1.0383E+00 | −8.1640E−01 | 8.9999E+01 |
| A4 = | 5.0202E−04 | 1.4333E−03 | −2.7320E−03 | 3.8555E−02 | 8.4349E−03 | 1.2739E−02 |
| A6 = | −1.0419E−05 | 1.4273E−05 | 8.9588E−05 | −1.2016E−02 | 1.1506E−03 | −3.5421E−03 |
| A8 = | 1.1305E−07 | −1.8068E−06 | −6.3144E−06 | 9.2398E−03 | −5.1212E−04 | 9.7646E−04 |
| A10 = | −7.5900E−10 | 6.3509E−08 | 2.0457E−07 | −2.8599E−03 | 1.2024E−04 | −5.7451E−04 |
| A12 = | 3.1527E−12 | −1.2163E−09 | −2.9061E−09 | 3.4535E−04 | −1.2161E−05 | 1.8288E−04 |
| A14 = | −7.4170E−15 | 1.3419E−11 | 1.5658E−11 | −1.4886E−05 | −1.3436E−06 | −2.8773E−05 |
| A16 = | 7.6136E−18 | −6.4867E−14 | | | 1.6962E−07 | 1.9623E−06 |

| Surface # | 8 | 9 | 10 | 11 | 12 | 13 |
|---|---|---|---|---|---|---|
| k = | −5.8119E+00 | −5.5576E+00 | −7.5938E+00 | 0.0000E+00 | −1.0320E+01 | −5.7428E−01 |
| A4 = | 8.4494E−03 | −1.2189E−01 | −1.9840E−01 | −1.0430E−01 | 1.0463E−02 | 5.3833E−02 |
| A6 = | −5.8183E−03 | −1.1773E−01 | 1.2784E−01 | 1.5515E−01 | −4.5253E−03 | −8.2898E−03 |
| A8 = | −1.0234E−01 | 1.9474E−01 | −1.2323E−01 | −1.4775E−01 | 1.5909E−03 | 2.3777E−03 |
| A10 = | 2.4617E−01 | −2.7826E−01 | −1.8879E−03 | 9.6730E−02 | −6.2303E−04 | −6.0349E−04 |
| A12 = | 4.6361E−01 | 2.1327E−01 | 1.5087E−01 | −3.2914E−02 | 1.2091E−04 | 6.2784E−05 |
| A14 = | 2.8752E−01 | −5.6061E−02 | −6.9058E−02 | 4.7323E−03 | −7A170E−06 | −1.5117E−06 |

In the 6th embodiment, the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 1.32 | (Sag22 − Sag21)/CT2 | 0.82 |
| Fno | 1.85 | Sag22/Y22 | 1.81 |
| HFOV [deg.] | 80.0 | T12/CT1 | 0.90 |
| FOV [deg.] | 160.0 | (R5 + R6)/(R5 − R6) | −0.64 |
| Y11/EPD | 20.13 | (f/|R1|) + (f/|R2|) | 0.05 |
| Y11/ImgH | 6.33 | |f2/f1| | 0.04 |
| Sag12_1.0Y/Sag12_0.5Y | 12.38 | | |

Furthermore, in the image capturing lens system according to the 6th embodiment, when the focal length of the first lens element 610 is f1, the focal length of the second lens element 620 is f2, a focal length of the third lens element 630 is f3, a focal length of the fourth lens element 640 is f4, a focal length of the fifth lens element 650 is f5, and a focal length of the sixth lens element 660 is f6, the following conditions are satisfied: |f2|<|f1|; |f3|<|f1|; |f4|<|f1|; |f5|<|f1|; and |f6|<|f1|.

7th Embodiment

Figure 13:
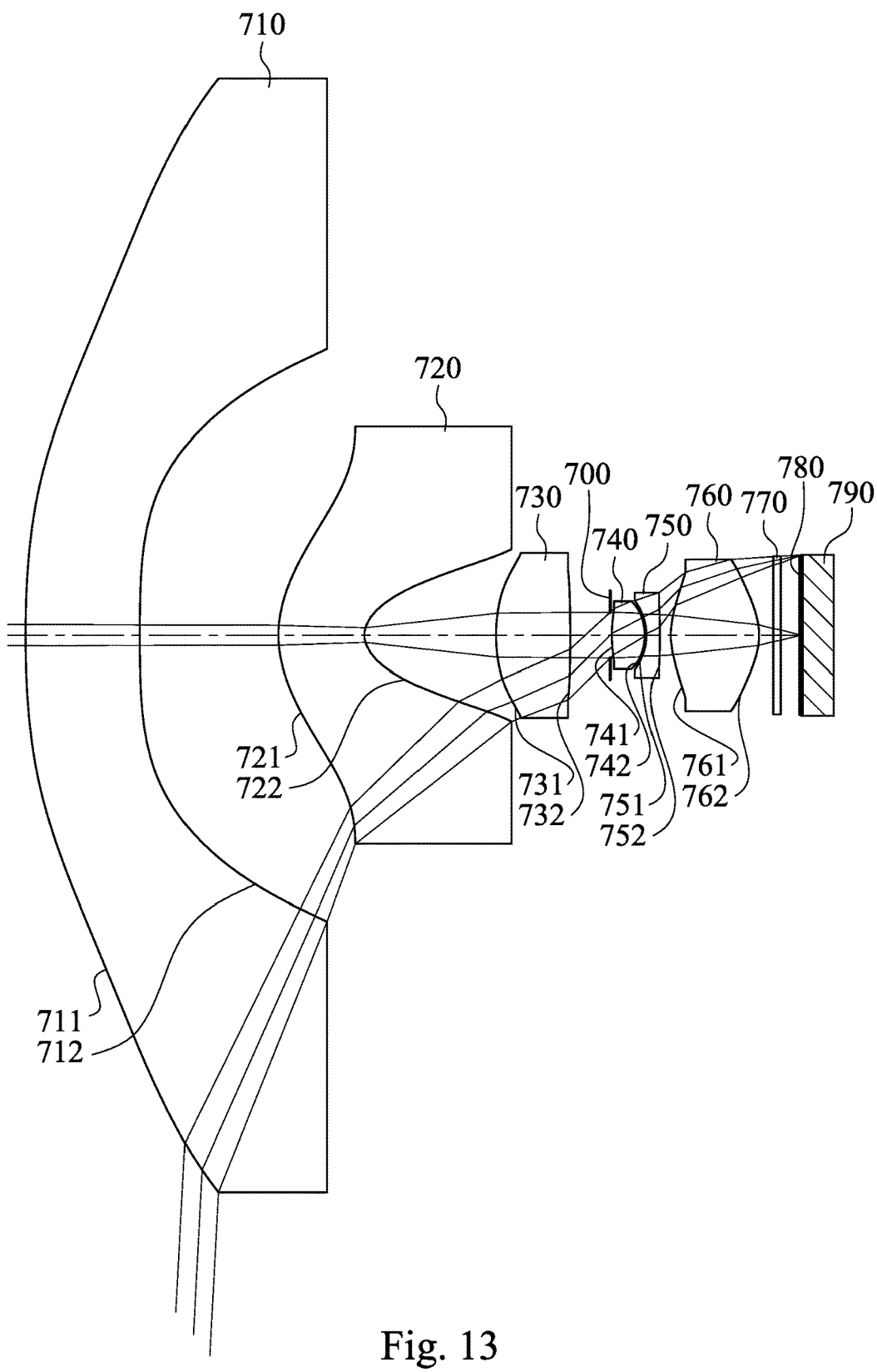
FIG. 13 is a schematic view of an image capturing apparatus according to the 7th embodiment of the present disclosure.
Figure 14:
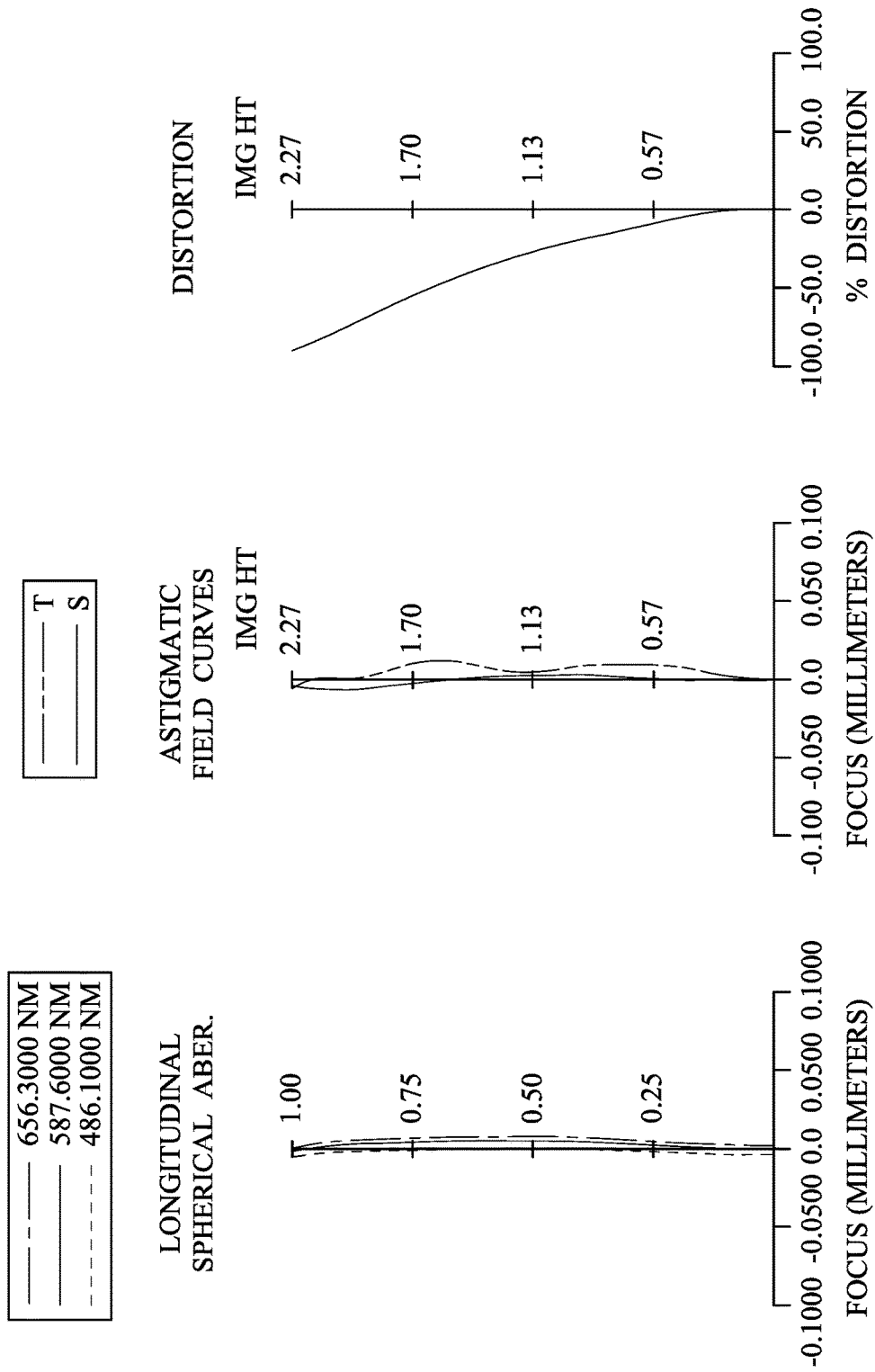
FIG. 14 shows spherical aberration curves, astigmatic field curves and a distortion curve of the image capturing apparatus according to the 7th embodiment.

FIG. 13 is a schematic view of an image capturing apparatus according to the 7th embodiment of the present disclosure. FIG. 14 shows spherical aberration curves, astigmatic field curves and a distortion curve of the image capturing apparatus according to the 7th embodiment. In FIG. 13, the image capturing apparatus includes the image capturing lens system (its reference numeral is omitted) and an image sensor 790. The image capturing lens system includes, in order from an object side to an image side, a first lens element 710, a second lens element 720, a third lens element 730, an aperture stop 700, a fourth lens element 740, a fifth lens element 750, a sixth lens element 760, an IR-cut filter 770 and an image surface 780. The image sensor 790 is disposed on the image surface 780 of the image capturing lens system. The imaging optical lens system includes six lens elements (710, 720, 730, 740, 750, and 760) without additional one or more lens elements inserted between the first lens element 710 and the sixth lens element 760, wherein the lens elements (the first, second, and third lens elements) located between an imaged object and the aperture stop 700 are a front lens group, and the lens elements (the fourth, fifth, and sixth lens elements) located between the aperture stop 700 and the image surface 780 are a rear lens group.

The first lens element 710 with positive refractive power has an object-side surface 711 being convex and an image-side surface 712 being concave. The first lens element 710 is made of a plastic material, and has the object-side surface 711 and the image-side surface 712 being both aspheric. Furthermore, each of the object-side surface 711 and the image-side surface 712 includes at least one inflection point.

The second lens element 720 with negative refractive power has an object-side surface 721 being convex and an image-side surface 722 being concave. The second lens element 720 is made of a plastic material, and has the object-side surface 721 and the image-side surface 722 being both aspheric. Furthermore, each of the object-side surface 721 and the image-side surface 722 includes at least one inflection point.

The third lens element 730 with positive refractive power has an object-side surface 731 being convex and an image-side surface 732 being convex. The third lens element 730 is made of a plastic material, and has the object-side surface 731 and the image-side surface 732 being both aspheric.

The fourth lens element 740 with positive refractive power has an object-side surface 741 being convex and an image-side surface 742 being convex. The fourth lens element 740 is made of a plastic material, and has the object-side surface 741 and the image-side surface 742 being both aspheric.

The fifth lens element 750 with negative refractive power has an object-side surface 751 being concave and an image-side surface 752 being concave. The fifth lens element 750 is made of a plastic material, and has the object-side surface 751 and the image-side surface 752 being both aspheric.

The sixth lens element 760 with positive refractive power has an object-side surface 761 being convex and an image-side surface 762 being convex. The sixth lens element 760 is made of a plastic material, and has the object-side surface 761 and the image-side surface 762 being both aspheric.

The IR-cut filter 770 is made of a glass material and located between the sixth lens element 760 and the image surface 780, and will not affect the focal length of the image capturing lens system.

The detailed optical data of the 7th embodiment are shown in Table 13 and the aspheric surface data are shown in Table 14 below.

Moreover, these parameters can be calculated from Table 13 and Table 14 as the following values and satisfy the following conditions:

| 7th Embodiment | | | |
|---|---|---|---|
| f [mm] | 1.19 | (Sag22 − Sag21)/CT2 | 0.81 |
| Fno | 2.00 | Sag22/Y22 | 1.71 |
| HFOV [deg.] | 87.0 | T12/CT1 | 1.21 |

TABLE 13

7th Embodiment
f = 1.19 mm, Fno = 2.00, HFOV = 87.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 31.999 | ASP | 3.231 | Plastic | 1.515 | 56.5 | 148.18 |
| 2 | | 53.247 | ASP | 3.910 | | | | |
| 3 | Lens 2 | 3.364 | ASP | 2.430 | Plastic | 1.544 | 55.9 | −2.48 |
| 4 | | 0.718 | ASP | 3.713 | | | | |
| 5 | Lens 3 | 4.713 | ASP | 2.104 | Plastic | 1.660 | 20.4 | 6.08 |
| 6 | | −22.275 | ASP | 1.127 | | | | |
| 7 | Ape. Stop | Plano | | 0.046 | | | | |
| 8 | Lens 4 | 3.885 | ASP | 0.930 | Plastic | 1.523 | 52.3 | 2.31 |
| 9 | | −1.614 | ASP | 0.050 | | | | |
| 10 | Lens 5 | −1.624 | ASP | 0.363 | Plastic | 1.671 | 19.5 | −2.39 |
| 11 | | 139.749 | ASP | 0.311 | | | | |
| 12 | Lens 6 | 2.094 | ASP | 2.500 | Plastic | 1.523 | 52.3 | 2.42 |
| 13 | | −1.888 | ASP | 0.400 | | | | |
| 14 | IR-cut filter | Plano | | 0.210 | Glass | 1.517 | 64.2 | — |
| 15 | | Plano | | 0.576 | | | | |
| 16 | Image | Plano | | — | | | | |

Reference wavelength is 587.6 nm (d-line).

TABLE 14

Aspheric Coefficients

| Surface # | 1 | 2 | 3 | 4 | 5 | 6 |
|---|---|---|---|---|---|---|
| k = | 5.4515E−01 | 0.0000E+00 | −1.1510E+00 | −1.0398E+00 | −1.6490E+00 | 8.6278E+01 |
| A4 = | 4.8412E−04 | 1.2994E−03 | −2.7029E−03 | 3.7709E−02 | 8.0369E−03 | 9.8344E−03 |
| A6 = | −8.1773E−06 | 1.7874E−05 | 8.9714E−05 | −1.2157E−02 | 1.6732E−03 | −2.9711E−03 |
| A8 = | 6.5220E−08 | −1.5865E−06 | −6.3135E−06 | 9.2405E−03 | −1.0335E−03 | 2.7843E−04 |
| A10 = | −3.0017E−10 | 5.3084E−08 | 2.0459E−07 | −2.8604E−03 | 3.3479E−04 | 5.3998E−06 |
| A12 = | 8.2309E−13 | −1.0259E−09 | −2.9061E−09 | 3.4535E−04 | −6.5171E−05 | −1.3898E−05 |
| A14 = | −1.2541E−15 | 1.1189E−11 | 1.5658E−11 | −1.4886E−05 | 5.3631E−06 | 2.6097E−06 |
| A16 = | 8.2719E−19 | −5.1882E−14 | | | −1.4897E−07 | −1.0831E−07 |

| Surface # | 8 | 9 | 10 | 11 | 12 | 13 |
|---|---|---|---|---|---|---|
| k = | −8.3229E+00 | −6.4987E+00 | −9.0174E+00 | 0.0000E+00 | −1.1026E+01 | −5.7110E−01 |
| A4 = | 7.5642E−03 | −1.5072E−01 | −2.2766E−01 | −9.6965E−02 | 1.1316E−02 | 4.8830E−02 |
| A6 = | 1.5135E−03 | −1.3382E−01 | 1.3499E−01 | 1.4979E−01 | −4.7883E−03 | −7.5256E−03 |
| A8 = | −1.3602E−01 | 2.2240E−01 | −1.2538E−01 | −1.4670E−01 | 1.6284E−03 | 2.4225E−03 |
| A10 = | 2.7583E−01 | −2.8968E−01 | 3.5469E−04 | 9.5933E−02 | −6.2467E−04 | −6.1081E−04 |
| A12 = | −4.6361E−01 | 2.1327E−01 | 1.5087E−01 | −3.2914E−02 | 1.2091E−04 | 6.2784E−05 |
| A14 = | 2.8752E−01 | −5.6061E−02 | −6.9058E−02 | 4.7323E−03 | −7.4170E−06 | −1.5117E−06 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

-continued

| 7th Embodiment | | | |
|---|---|---|---|
| FOV [deg.] | 174.0 | (R5 + R6)/(R5 − R6) | −0.65 |
| Y11/EPD | 26.43 | (f/|R1|) + (f/|R2|) | 0.06 |
| Y11/ImgH | 6.93 | |f2/f1| | 0.02 |
| Sag12_1.0Y/Sag12_0.5Y | 10.33 | | |

Furthermore, in the image capturing lens system according to the 7th embodiment, when the focal length of the first lens element 710 is f1, the focal length of the second lens element 720 is f2, a focal length of the third lens element 730 is f3, a focal length of the fourth lens element 740 is f4, a focal length of the fifth lens element 750 is f5, and a focal length of the sixth lens element 760 is f6, the following conditions are satisfied: |f2|<|f1|; |f3|<|f1|; |f4|<|f1|; f5|<|f1|; and |f6|<|f1|.

8th Embodiment

Figure 15:
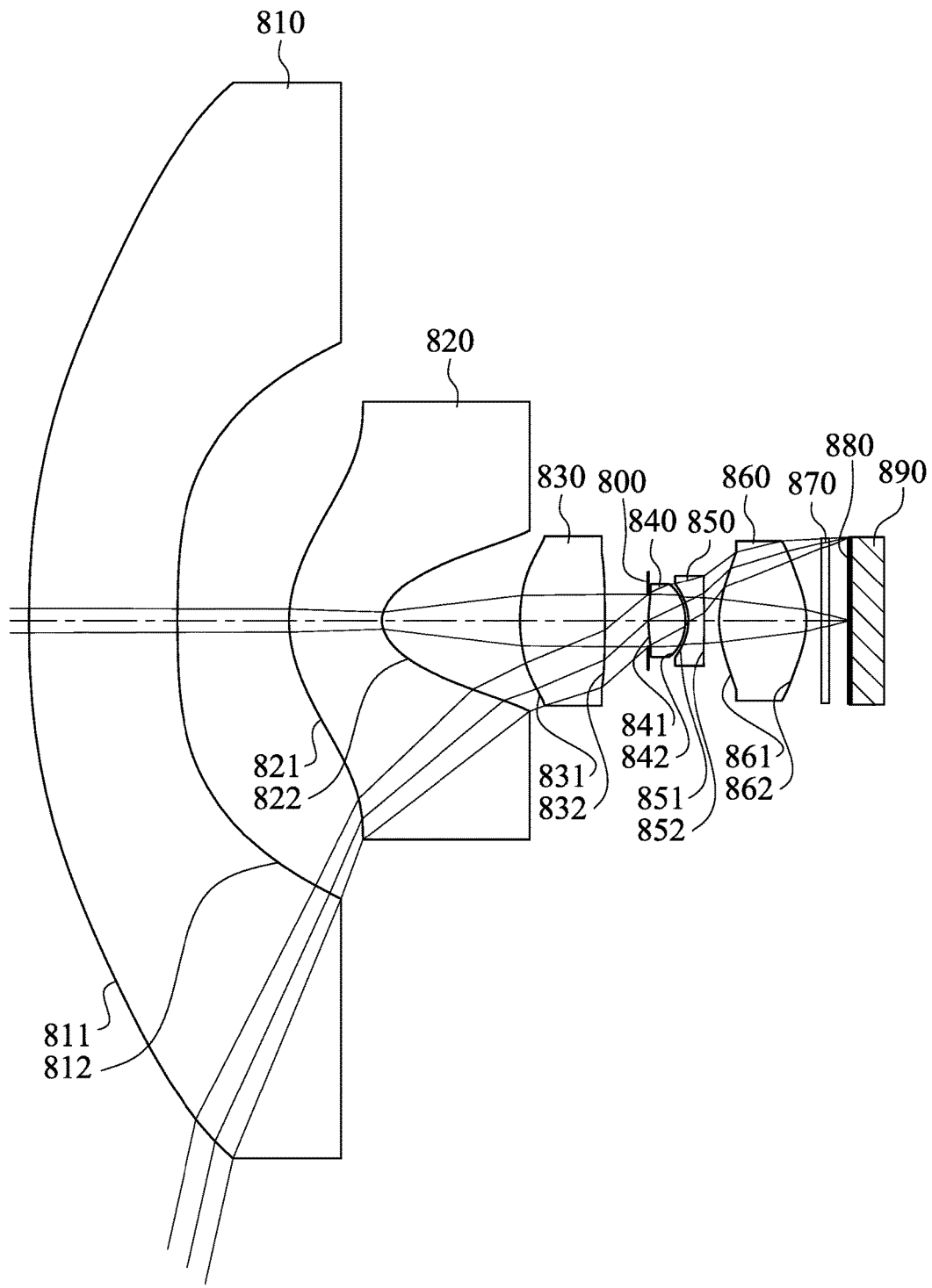
FIG. 15 is a schematic view of an image capturing apparatus according to the 8th embodiment of the present disclosure.
Figure 16:
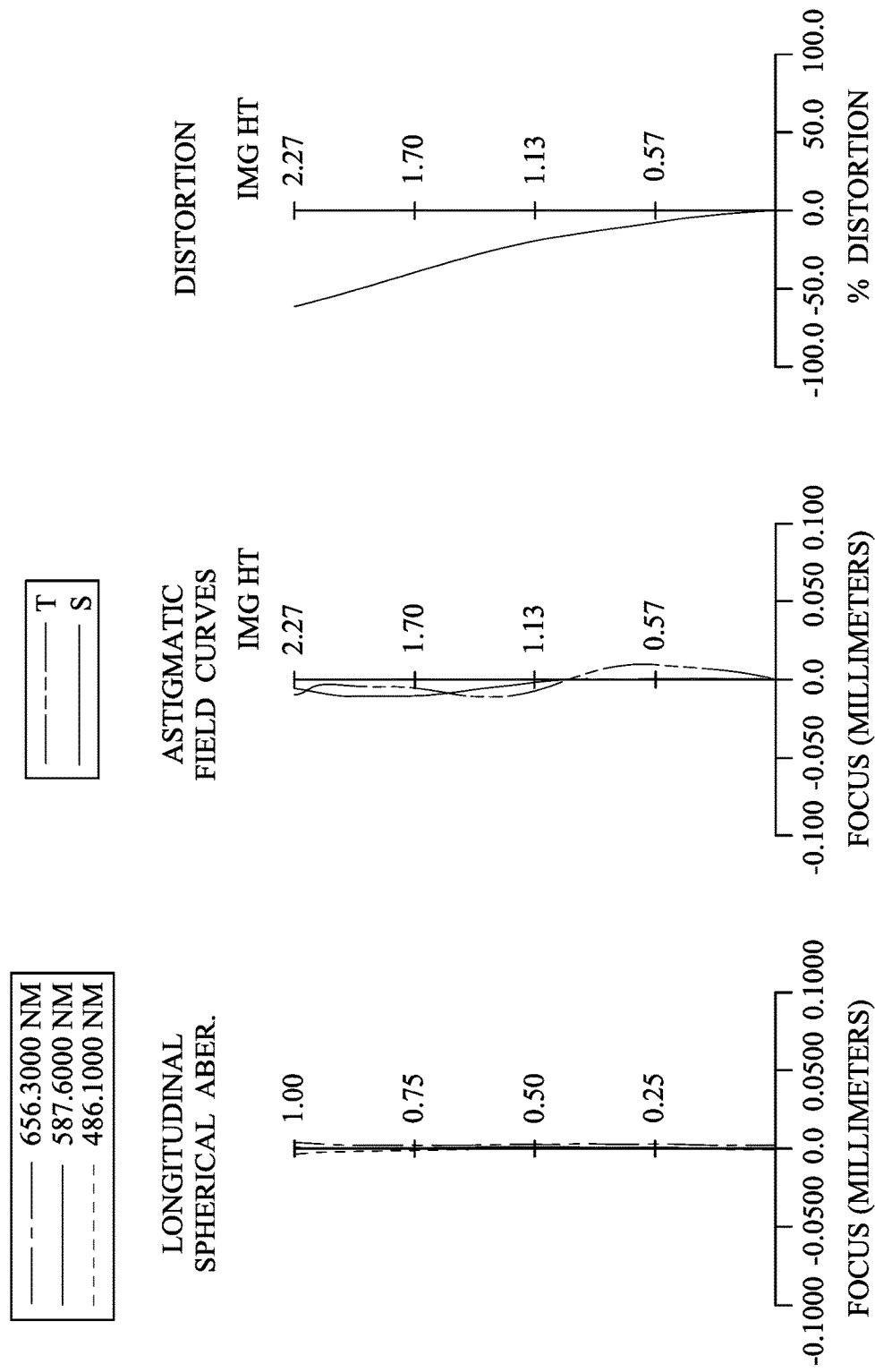
FIG. 16 shows spherical aberration curves, astigmatic field curves and a distortion curve of the image capturing apparatus according to the 8th embodiment.

FIG. 15 is a schematic view of an image capturing apparatus according to the 8th embodiment of the present disclosure. FIG. 16 shows spherical aberration curves, astigmatic field curves and a distortion curve of the image capturing apparatus according to the 8th embodiment. In FIG. 15, the image capturing apparatus includes the image capturing lens system (its reference numeral is omitted) and an image sensor 890. The image capturing lens system includes, in order from an object side to an image side, a first lens element 810, a second lens element 820, a third lens element 830, an aperture stop 800, a fourth lens element 840, a fifth lens element 850, a sixth lens element 860, an IR-cut filter 870 and an image surface 880. The image sensor 890 is disposed on the image surface 880 of the image capturing lens system. The imaging optical lens system includes six lens elements (810, 820, 830, 840, 850, and 860) without additional one or more lens elements inserted between the first lens element 810 and the sixth lens element 860, wherein the lens elements (the first, second, and third lens elements) located between an imaged object and the aperture stop 800 are a front lens group, and the lens elements (the fourth, fifth, and sixth lens elements) located between the aperture stop 800 and the image surface 880 are a rear lens group.

The first lens element 810 with positive refractive power has an object-side surface 811 being convex and an image-side surface 812 being concave. The first lens element 810 is made of a plastic material, and has the object-side surface 811 and the image-side surface 812 being both aspheric.

The second lens element 820 with negative refractive power has an object-side surface 821 being convex and an image-side surface 822 being concave. The second lens element 820 is made of a plastic material, and has the object-side surface 821 and the image-side surface 822 being both aspheric. Furthermore, each of the object-side surface 821 and the image-side surface 822 includes at least one inflection point.

The third lens element 830 with positive refractive power has an object-side surface 831 being convex and an image-side surface 832 being convex. The third lens element 830 is made of a plastic material, and has the object-side surface 831 and the image-side surface 832 being both aspheric.

The fourth lens element 840 with positive refractive power has an object-side surface 841 being convex and an image-side surface 842 being convex. The fourth lens element 840 is made of a plastic material, and has the object-side surface 841 and the image-side surface 842 being both aspheric.

The fifth lens element 850 with negative refractive power has an object-side surface 851 being concave and an image-side surface 852 being planar. The fifth lens element 850 is made of a plastic material, and has the object-side surface 851 and the image-side surface 852 being both aspheric.

The sixth lens element 860 with positive refractive power has an object-side surface 881 being convex and an image-side surface 862 being convex. The sixth lens element 860 is made of a plastic material, and has the object-side surface 861 and the image-side surface 862 being both aspheric.

The IR-cut filter 870 is made of a glass material and located between the sixth lens element 860 and the image surface 880, and will not affect the focal length of the image capturing lens system.

The detailed optical data of the 8th embodiment are shown in Table 15 and the aspheric surface data are shown in Table 16 below.

TABLE 15

8th Embodiment
f = 1.29 mm, Fno = 1.95, HFOV = 77.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 30.571 | ASP | 4.000 | Plastic | 1.515 | 56.5 | 224.97 |
| 2 | | 39.604 | ASP | 3.023 | | | | |
| 3 | Lens 2 | 3.533 | ASP | 2.500 | Plastic | 1.544 | 56.0 | −2.62 |
| 4 | | 0.762 | ASP | 3.739 | | | | |
| 5 | Lens 3 | 4.786 | ASP | 2.292 | Plastic | 1.639 | 23.5 | 6.25 |
| 6 | | −19.583 | ASP | 1.164 | | | | |
| 7 | Ape. Stop | Plano | | 0.006 | | | | |
| 8 | Lens 4 | 3.755 | ASP | 0.996 | Plastic | 1.534 | 55.9 | 2.13 |
| 9 | | −1.479 | ASP | 0.081 | | | | |
| 10 | Lens 5 | −1.486 | ASP | 0.438 | Plastic | 1.650 | 21.5 | −2.28 |
| 11 | | ∞ | ASP | 0.401 | | | | |
| 12 | Lens 6 | 2.230 | ASP | 2.357 | Plastic | 1.515 | 56.5 | 2.65 |
| 13 | | −2.245 | ASP | 0.400 | | | | |
| 14 | IR-cut filter | Plano | | 0.210 | Glass | 1.517 | 64.2 | — |
| 15 | | Plano | | 0.554 | | | | |
| 16 | Image | Plano | | — | | | | |

Reference wavelength is 587.6 nm (d-line).

TABLE 16

Aspheric Coefficients

| Surface # | 1 | 2 | 3 | 4 | 5 | 6 |
|---|---|---|---|---|---|---|
| k = | 1.7310E+00 | 0.0000E+00 | −1.1758E+00 | −1.0614E+00 | −1.7378E+00 | 8.9669E+01 |
| A4 = | 2.9285E−04 | 1.6807E−03 | −2.6497E−03 | 3.4409E−02 | 8.6953E−03 | 1.0501E−02 |
| A6 = | −4.6413E−06 | −2.0018E−05 | 7.5749E−05 | −8.7411E−03 | 4.7306E−04 | −1.9005E−03 |
| A8 = | 4.1476E−08 | 6.6620E−07 | −4.8558E−06 | 7.4350E−03 | 3.2502E−04 | 7.1382E−04 |
| A10 = | −2.6560E−10 | −3.5077E−08 | 1.3938E−07 | −2.2383E−03 | −3.4025E−04 | −1.3376E−03 |
| A12 = | 1.1923E−12 | 9.7208E−10 | −1.5140E−09 | 2.4917E−04 | 1.1851E−04 | 6.4675E−04 |
| A14 = | −3.1823E−15 | −1.1509E−11 | 4.3365E−12 | −9.5094E−06 | −2.1320E−06 | −1.3316E−04 |
| A16 = | 3.7403E−18 | 4.6881E−14 | | | 1.3863E−06 | 1.0750E−05 |

| Surface # | 8 | 9 | 10 | 11 | 12 | 13 |
|---|---|---|---|---|---|---|
| k = | −9.9047E+00 | −4.0309E+00 | −5.8298E+00 | 0.0000E+00 | −1.0065E+01 | −4.5030E−01 |
| A4 = | 8.3382E−03 | −1.6460E−01 | −2.3808E−01 | −8.5351E−02 | 1.0547E−02 | 4.4005E−02 |
| A6 = | −2.6028E−02 | 1.0690E−01 | 3.3198E−01 | 1.3759E−01 | −4.2868E−03 | −8.1635E−03 |
| A8 = | −6.2610E−02 | −3.8089E−01 | −6.8382E−01 | −1.3571E−01 | 1.7229E−03 | 2.5424E−03 |
| A10 = | 5.5608E−02 | 4.4356E−01 | 8.2596E−01 | 9.4179E−02 | −6.1230E−04 | −6.9416E−04 |
| A12 = | −7.7750E−02 | −2.1308E−01 | −4.6851E−01 | −3.4543E−02 | 1.1848E−04 | 6.2075E−05 |
| A14 = | −9.2520E−02 | 1.3745E−02 | 1.1052E−01 | 5.4304E−03 | −8.8439E−06 | −2.1604E−06 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 1.29 | (Sag22 − Sag21)/CT2 | 0.80 |
| Fno | 1.95 | Sag22/Y22 | 1.63 |
| HFOV [deg.] | 77.5 | T12/CT1 | 0.76 |
| FOV [deg.] | 155.0 | (R5 + R6)/(R5 − R6) | −0.61 |
| Y11/EPD | 21.99 | (f/|R1|) + (f/|R2|) | 0.07 |
| Y11/ImgH | 6.41 | |f2/f1| | 0.01 |
| Sag12_1.0Y/Sag12_0.5Y | 9.36 | | |

Furthermore, in the image capturing lens system according to the 8th embodiment, when the focal length of the first lens element 810 is f1, the focal length of the second lens element 820 is f2, a focal length of the third lens element 830 is f3, a focal length of the fourth lens element 840 is f4, a focal length of the fifth lens element 850 is f5, and a focal length of the sixth lens element 860 is f8, the following conditions are satisfied: |f2|<|f1|; |f3|<|f1|; |f4|<|f1|; |f5|<|f1|; and |f6|<|f1|.

9th Embodiment

Figure 19A:
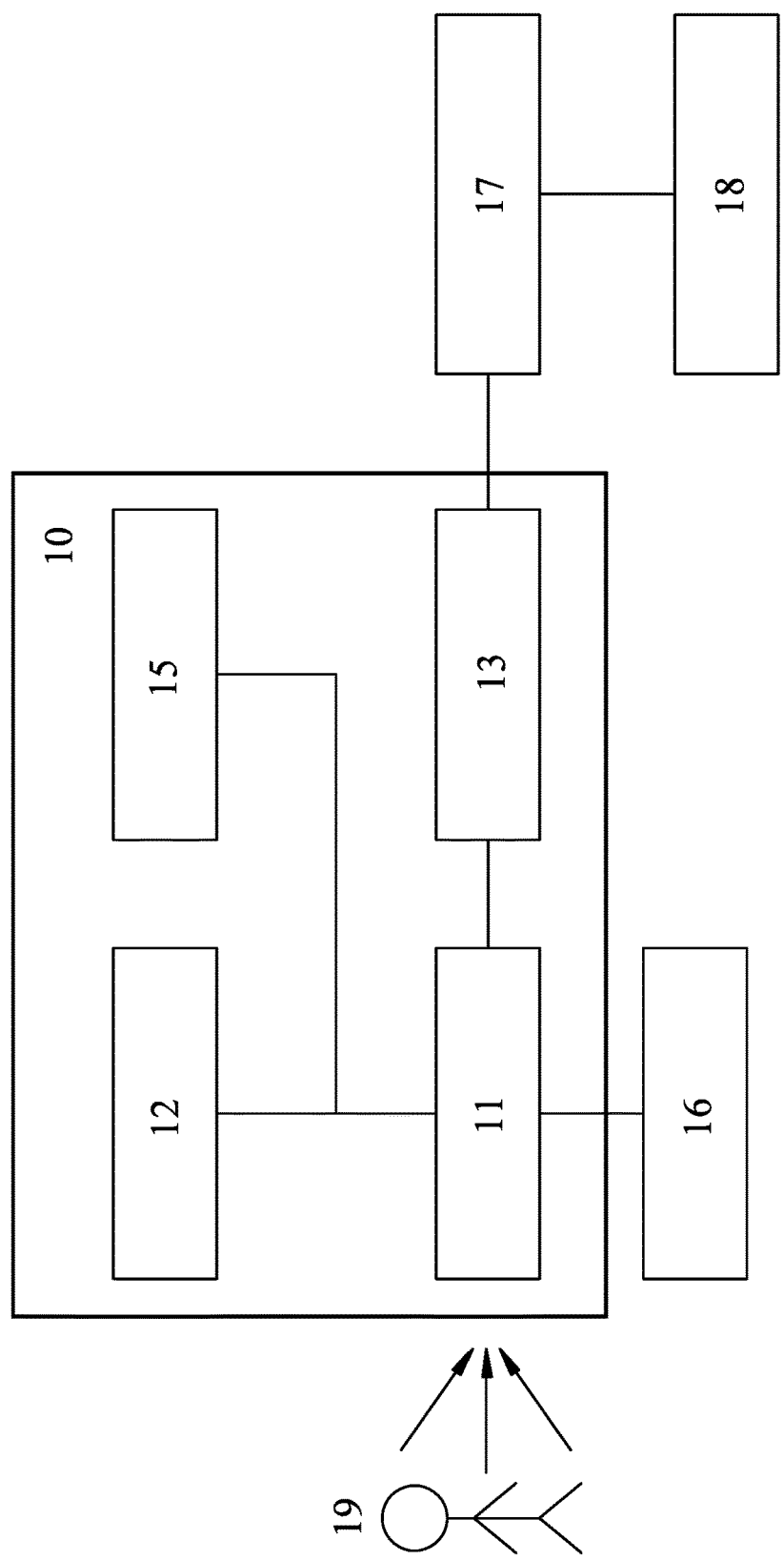
FIG. 19A is a system schematic view of an image capturing apparatus according to the 9th embodiment of the present disclosure.
Figure 19B:
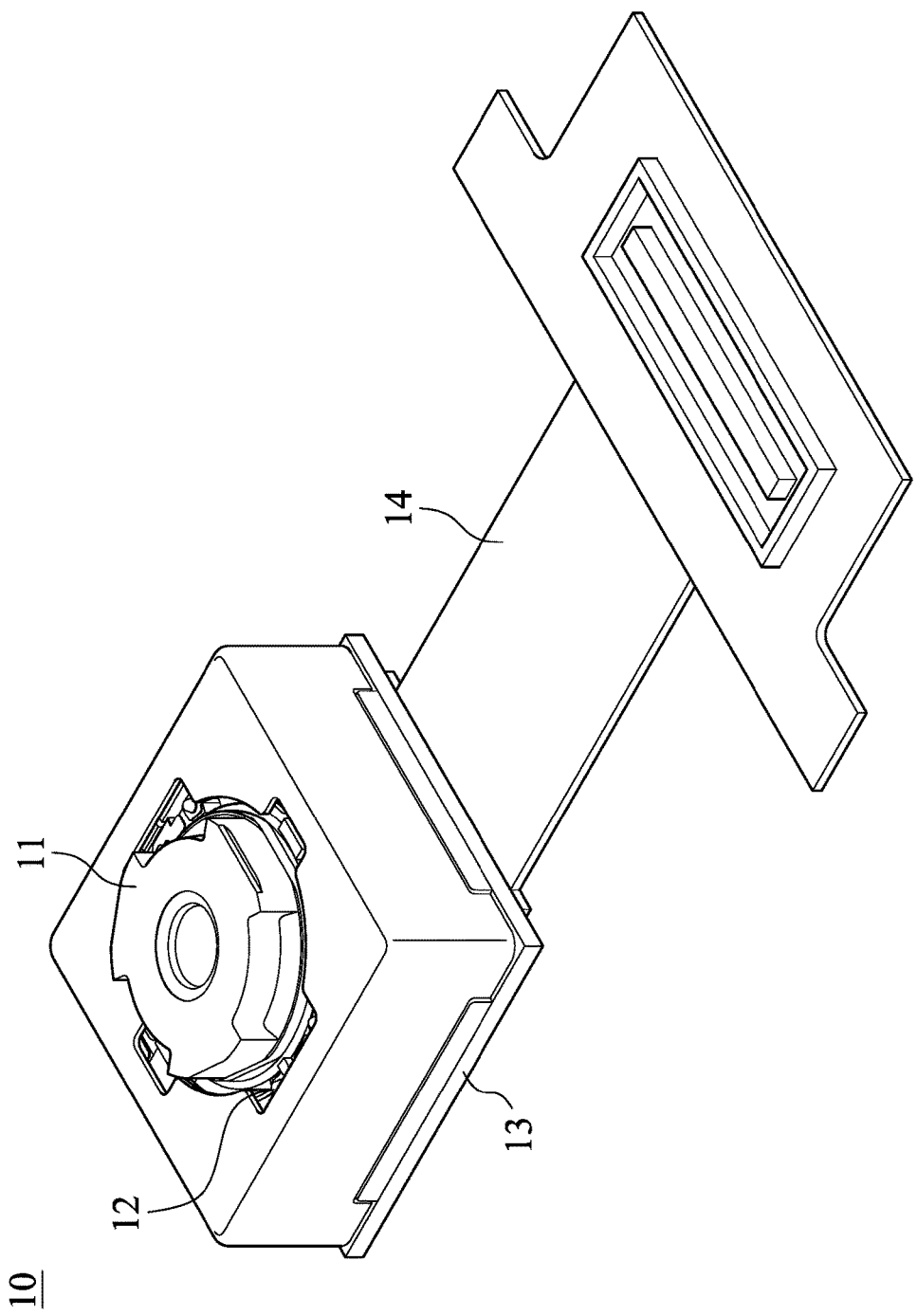
FIG. 19B is a three-dimensional schematic view of the image capturing apparatus of FIG. 19A.

FIG. 19A is a system schematic view of an image capturing apparatus 10 according to the 9th embodiment of the present disclosure. FIG. 19B is a three-dimensional schematic view of the image capturing apparatus 10 of FIG. 19A. In FIG. 19A and FIG. 19B, the image capturing apparatus 10 is a camera module, the image capturing apparatus 10 includes an imaging lens assembly 11, a driving apparatus 12, an image sensor 13 and a wire circuit 14, wherein the imaging lens assembly 11 includes the image capturing lens system according to the 1st embodiment and a lens barrel for carrying the image capturing lens system. The image capturing apparatus 10 can converge light by utilizing the imaging lens assembly 11 for capturing the imaged object 19 and can focus by the driving apparatus 12, and generate images on the image sensor 13, and then the image data can be transmitted via the wire circuit 14.

The driving apparatus 12 can be an Auto-focus module, which is driven by driving systems, such as voice coil motors (VCM), micro electro-mechanical systems (MEMS), piezoelectric systems, and shape memory alloys etc., while using a focusing assisting module with laser or infrared to measure distances. The image capturing lens system can obtain a favorable imaging position with the driving apparatus 12 so as to capture clear images with the imaged object 19 having different object distances. Moreover, the image capturing apparatus 10 can further include an image stabilization module 15, which can be a kinetic energy sensor, such as an accelerator, a gyroscope, and a Hall effect sensor, so that the variation of different axial directions of the image capturing lens system can adjusted so as to compensate the image blur generated by motion during exposure, and it is further favorable for enhancing the image quality under dynamic and low illumination situation. Furthermore, advanced image compensation functions, such as optical image stabilizations (OIS) and electronic image stabilizations (EIS) etc., can be provided.

The image capturing apparatus 10 can includes the image sensor 13 located on the image surface of the image capturing lens system, such as CMOS and CCD, which has superior photosensitivity and low noise, thus it is favorable for truly presenting high image quality thereof. Furthermore, the image sensor 13 can be further connected to an image signal processor 17 (ISP) and an image software processor 18 so as to optimize the image quality.

Moreover, the image capturing apparatus 10 can further include a flash module 16, so that the image quality can be optimized by supplying additional illumination during exposure.

10th Embodiment

Figure 20:
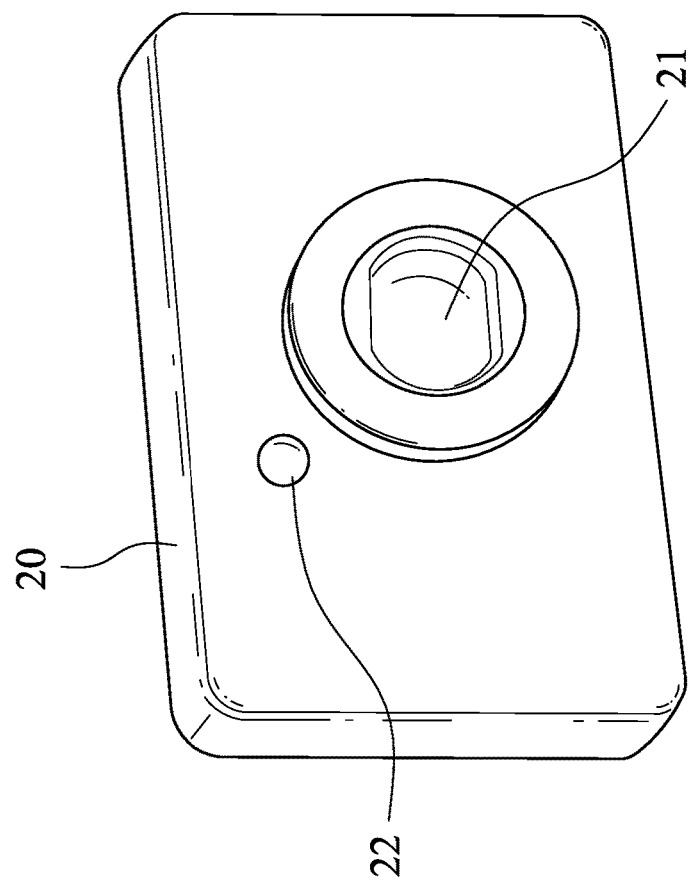
FIG. 20 is a schematic view of an electronic device according to the 10th embodiment of the present disclosure.

FIG. 20 is a schematic view of an electronic device 20 according to the 10th embodiment of the present disclosure. According to the 10th embodiment, the electronic device 20 is a driving recording system, the electronic device 20 includes an image capturing apparatus 21, a flash module 22, an image signal processor (its reference numeral is omitted), wherein the image signal processor and the corresponding element are the same, and will not describe again herein. When the user captures the image, the electronic device 20 converges light and capturing image via the image capturing apparatus 21, fills light via the flash module 22, and optimizes the image via the image signal processor, thus the image quality can be further enhanced. Wherein, the various functions of the image processing software can be utilized for image capturing and processing.

11th Embodiment

Figure 21:
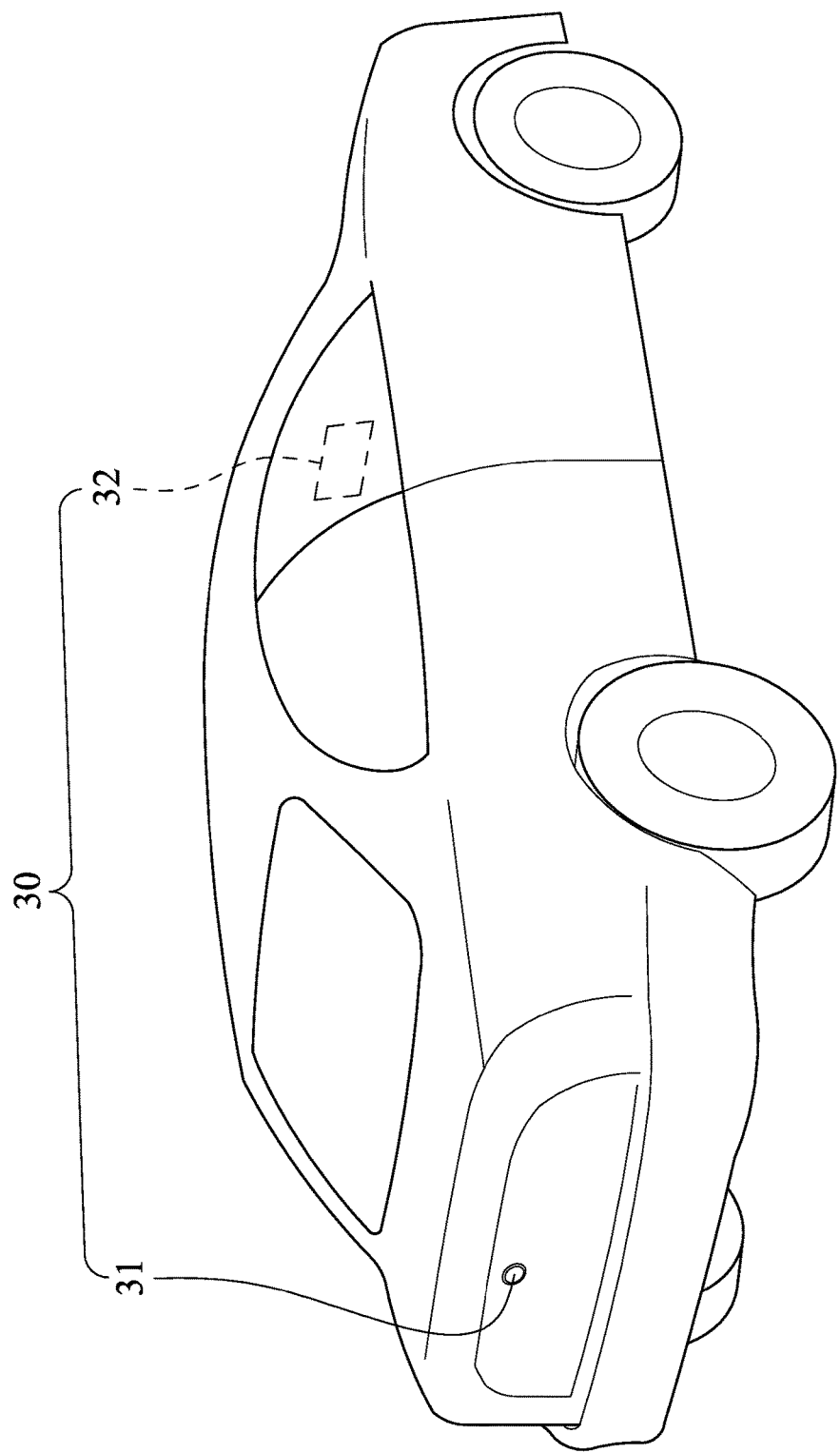
FIG. 21 is a schematic view of an electronic device according to the 11th embodiment of the present disclosure.

FIG. 21 is a schematic view of an electronic device 30 according to the 11th embodiment of the present disclosure. According to the 11th embodiment, the electronic device 30 is a rearview camera system, the electronic device 30 includes an image capturing apparatus 31 and a screen 32, the image capturing apparatus 31 includes an image capturing lens system according to the present disclosure (its reference numeral is omitted) and an image sensor (its reference numeral is omitted), wherein the image sensor is disposed on an image surface of the image capturing lens system, the screen 32 is electronically connected to the image capturing apparatus 31 so as to display the captured image.

12th Embodiment

Figure 22:
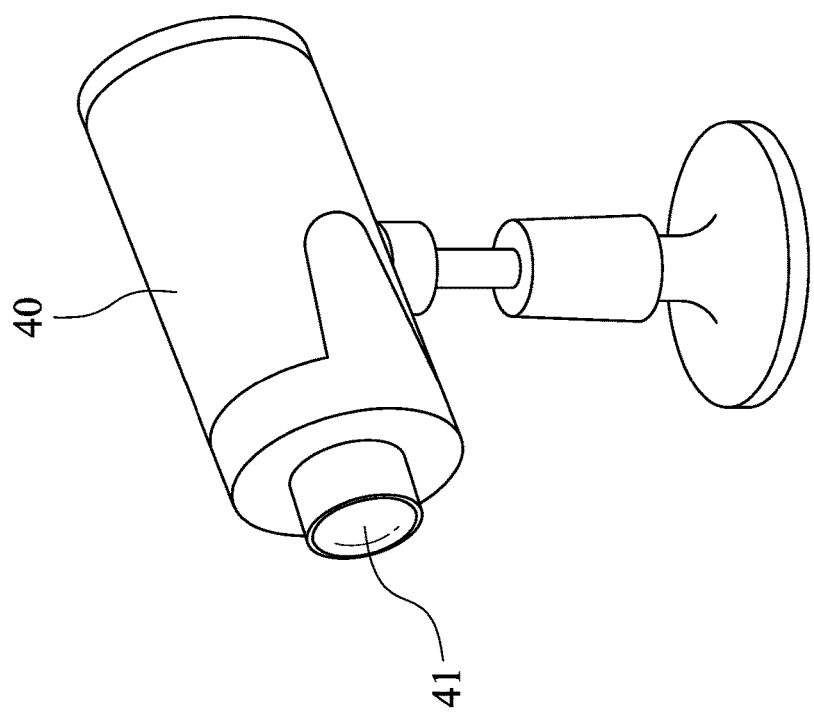
FIG. 22 is a schematic view of an electronic device 40 according to the 12th embodiment of the present disclosure.

FIG. 22 is a schematic view of an electronic device 40 according to the 12th embodiment of the present disclosure. The electronic device 40 of the 12th embodiment is a surveillance device, wherein the electronic device 40 includes an image capturing apparatus 41. The image capturing apparatus 41 includes an image capturing lens system (its reference numeral is omitted) according to the present disclosure and an image sensor (its reference numeral is omitted), wherein the image sensor is disposed on an image surface of the image capturing lens system.

The foregoing description, for purpose of explanation, has been described with reference to specific embodiments. It is to be noted that Tables 1-16 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image capturing lens system comprising six lens elements, the six lens elements being, in order from an object side to an image side:
   a first lens element having positive refractive power;
   a second lens element;
   a third lens element;
   a fourth lens element;
   a fifth lens element; and
   a sixth lens element;
   wherein a maximum effective radius of an object-side surface of the first lens element is Y11, an entrance pupil diameter of the image capturing lens system is EPD, and the following condition is satisfied:

$12.5 < Y11/EPD$.

2. The image capturing lens system of claim 1, wherein the maximum effective radius of the object-side surface of the first lens element is Y11, the entrance pupil diameter of the image capturing lens system is EPD, and the following condition is satisfied:

$15 < Y11/EPD < 50$.

3. The image capturing lens system of claim 2, wherein the maximum effective radius of the object-side surface of the first lens element is Y11, the entrance pupil diameter of the image capturing lens system is EPD, and the following condition is satisfied:

$17.5 < Y11/EPD < 35$.

4. The image capturing lens system of claim 1, wherein a focal length of the first lens element is f1, a focal length of the second lens element is f2, and the following condition is satisfied:

$|f2/f1| < 0.30$.

5. The image capturing lens system of claim 1, wherein the second lens element has negative refractive power, and the third lens element has positive refractive power.

6. The image capturing lens system of claim 1, wherein at least two of the third lens element, the fourth lens element, the fifth lens element and the sixth lens element have positive refractive power, and at least one of the third lens element, the fourth lens element, the fifth lens element and the sixth lens element has negative refractive power.

7. The image capturing lens system of claim 1, wherein the second lens element has negative refractive power, the third lens element has positive refractive power, the fourth lens element has positive refractive power, the fifth lens element has negative refractive power, and the sixth lens element has positive refractive power.

8. The image capturing lens system of claim 1, wherein the second lens element has an object-side surface being convex and comprising at least one inflection point.

9. The image capturing lens system of claim 1, wherein at least one of an object-side surface and an image-side surface of the first lens element comprises at least one inflection point, the maximum effective radius of the object-side surface of the first lens element is Y11, a maximum image height of the image capturing lens system is ImgH, and the following condition is satisfied:

$2.5 < Y11/ImgH < 10$.

10. The image capturing lens system of claim 1, wherein the third lens element has an object-side surface being convex.

11. The image capturing lens system of claim 1, wherein a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, and the following conditions are satisfied:

$|f2| < |f1|$;

$|f3| < |f1|$;

$|f4| < |f1|$;

$|f5| < |f1|$; and $|f6| < |f1|$.

12. The image capturing lens system of claim 1, wherein a displacement in parallel with an optical axis from an axial vertex on an image-side surface of the second lens element to a maximum effective radius position on the image-side surface of the second lens element is SAG22, a maximum effective radius of the image-side surface of the second lens element is Y22, and the following condition is satisfied:

$1.0 < Sag22/Y22 < 2.0$.

13. The image capturing lens system of claim 1, wherein a curvature radius of an object-side surface of the third lens element is R5, a curvature radius of an image-side surface of the third lens element is R6, and the following condition is satisfied:

$-2.5 < (R5+R6)/(R5-R6) < 0$.

14. The image capturing lens system of claim 1, further comprising, in order from the object side to the image side:
a front lens group with negative refractive power having lens elements of the six lens elements;
an aperture stop; and
a rear lens group with positive refractive power having the other lens elements of the six lens elements;
wherein a maximum field of view of the image capturing lens system is FOV, and the following condition is satisfied:

120 degrees < FOV < 220 degrees.

15. The image capturing lens system of claim 1, wherein a focal length of the image capturing lens system is f, a curvature radius of an object-side surface of the first lens element is R1, a curvature radius of an image-side surface of the first lens element is R2, and the following condition is satisfied:

$(f/|R1|)+(f/|R2|) < 0.25$.

16. The image capturing lens system of claim 1, wherein a displacement in parallel with an optical axis from an axial vertex on an object-side surface of the second lens element to a maximum effective radius position on the object-side surface of the second lens element is Sag21, a displacement in parallel with an optical axis from an axial vertex on an image-side surface of the second lens element to a maximum effective radius position on the image-side surface of the second lens element is Sag22, a central thickness of the second lens element is CT2, and the following condition is satisfied:

$0.4 < (Sag22-Sag21)/CT2 < 1.5$.

17. The image capturing lens system of claim 1, wherein an axial distance between the first lens element and the second lens element is T12, a central thickness of the first lens element is CT1, and the following condition is satisfied:

$T12/CT1 < 2.0$.

18. The image capturing lens system of claim 1, wherein a displacement in parallel with an optical axis from an axial vertex on an image-side surface of the first lens element to a maximum effective radius position on the image-side surface of the first lens element is Sag12_1.0Y, and a displacement in parallel with an optical axis from an axial vertex on the image-side surface of the first lens element to a half of the maximum effective radius position on the image-side surface of the first lens element is Sag12_0.5Y, and the following condition is satisfied:

$5 < Sag12\_1.0Y/Sag12\_0.5Y$.

19. An image capturing apparatus, comprising:
the image capturing lens system of claim 1; and
an image sensor, wherein the image sensor is disposed on an image surface of the image capturing lens system.

20. An electronic device, comprising:
the image capturing apparatus of claim 19.

21. An image capturing lens system comprising six lens elements, the six lens elements being, in order from an object side to an image side:
a first lens element having at least one of an object-side surface and an image-side surface being aspheric, and at least one of the object-side surface and the image-side surface of the first lens element comprising at least one inflection point;
a second lens element;
a third lens element;
a fourth lens element;
a fifth lens element; and
a sixth lens element;
wherein a maximum effective radius of an object-side surface of the first lens element is Y11, an entrance pupil diameter of the image capturing lens system is EPD, a focal length of the image capturing lens system is f, a curvature radius of the object-side surface of the first lens element is R1, a curvature radius of the image-side surface of the first lens element is R2, a maximum field of view of the image capturing lens system is FOV, and the following conditions are satisfied:

$12.5 < Y11/EPD$;

$(f/|R1|)+(f/|R2|) < 0.15$; and 120 degrees < FOV < 220 degrees.

22. The image capturing lens system of claim 21, wherein a displacement in parallel with an optical axis from an axial vertex on an image-side surface of the second lens element to a maximum effective radius position on the image-side surface of the second lens element is Sag22, a maximum effective radius of the image-side surface of the second lens element is Y22, and the following condition is satisfied:

$1.0 < Sag22/Y22 < 2.0$.

23. The image capturing lens system of claim 21, wherein the maximum effective radius of the object-side surface of the first lens element is Y11, the entrance pupil diameter of the image capturing lens system is EPD, and the following condition is satisfied:

$17.5 < Y11/EPD < 35$.

24. The image capturing lens system of claim 21, wherein an axial distance between the first lens element and the second lens element is T12, a central thickness of the first lens element is CT1, and the following condition is satisfied:

$T12/CT1 < 2.0$.

25. The image capturing lens system of claim 21, wherein the first lens element has positive refractive power, the second lens element has negative refractive power, the third lens element has positive refractive power, the fourth lens element has positive refractive power, the fifth lens element has negative refractive power, and the sixth lens element has positive refractive power.

26. The image capturing lens system of claim 21, wherein a focal length of the first lens element is f1, a focal length of the second lens element is f2, a focal length of the third lens element is f3, a focal length of the fourth lens element is f4, a focal length of the fifth lens element is f5, a focal length of the sixth lens element s f6, and the following conditions are satisfied:

$|f2|<|f1|;$ $|f3|<|f1|;$ $|f4|<|f1|;$ $|f5|<|f1|;$ and $|f6|<|f1|.$

27. The image capturing lens system of claim 21, wherein a displacement in parallel with an optical axis from an axial vertex on the image-side surface of the first lens element to a maximum effective radius position on the image-side surface of the first lens element is Sag12_1.0Y, a displacement in parallel with an optical axis from an axial vertex on the image-side surface of the first lens element to a half of the maximum effective radius position on the image-side surface of the first lens element is Sag12_0.5Y, and the following condition is satisfied:

$5<Sag12\_1.0Y/Sag12\_0.5Y.$

* * * * *